(12) United States Patent
Chung et al.

(10) Patent No.: US 7,868,787 B2
(45) Date of Patent: Jan. 11, 2011

(54) CHARACTER-INPUT METHOD AND MEDIUM AND APPARATUS FOR THE SAME

(75) Inventors: Ji-hye Chung, Seoul (KR); Yeun-bae Kim, Seongnam-si (KR); Hyun-jin Kim, Gwangju-si (KR); Tae-suh Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1096 days.

(21) Appl. No.: 11/513,214

(22) Filed: Aug. 31, 2006

(65) Prior Publication Data

US 2007/0080949 A1 Apr. 12, 2007

(30) Foreign Application Priority Data

Oct. 10, 2005 (KR) ...................... 10-2005-0095087

(51) Int. Cl.
*H03K 17/94* (2006.01)
*H03M 11/00* (2006.01)

(52) U.S. Cl. ............................. 341/33; 341/34; 345/168

(58) Field of Classification Search ................... 341/33, 341/34; D14/218, 174; D13/168; 345/168
See application file for complete search history.

(56) References Cited

U.S. PATENT DOCUMENTS

| | | | | |
|---|---|---|---|---|
| 5,311,175 A | * | 5/1994 | Waldman | 341/34 |
| 5,543,818 A | * | 8/1996 | Scott | 345/168 |
| 5,923,267 A | * | 7/1999 | Beuk et al. | 340/825.56 |
| 6,016,142 A | * | 1/2000 | Chang et al. | 715/763 |
| D424,062 S | * | 5/2000 | Barhold et al. | D14/218 |
| D434,027 S | * | 11/2000 | Barhold et al. | D14/218 |
| 6,525,676 B2 | * | 2/2003 | Kisaichi et al. | 341/22 |
| 6,580,414 B1 | * | 6/2003 | Wergen et al. | 345/156 |
| 6,593,913 B1 | * | 7/2003 | Krohn et al. | 345/168 |
| D478,066 S | * | 8/2003 | Goto | D14/218 |
| 6,680,677 B1 | * | 1/2004 | Tiphane | 341/22 |
| D489,711 S | * | 5/2004 | James et al. | D14/218 |
| 6,765,554 B2 | * | 7/2004 | Millington | 345/156 |

(Continued)

FOREIGN PATENT DOCUMENTS

JP 09-152924 6/1997

(Continued)

OTHER PUBLICATIONS

Notice of Allowance dated May 7, 2007, issued in corresponding Korean Patent Application No. 10-2005-0095087.

(Continued)

*Primary Examiner*—Timothy Edwards, Jr.
(74) *Attorney, Agent, or Firm*—Staas & Halsey LLP

(57) ABSTRACT

A character-input method is provided. The character-input method includes providing a plurality of objects having a predetermined arrangement, mapping characters included in a character group represented by a representative character mapped to an object identified as a first signal among objects to which representative characters are mapped, to one or more objects among the plurality of objects when the first signal is received from a user input device, and inputting characters mapped to an object identified as the second signal among objects to which the characters are mapped.

20 Claims, 16 Drawing Sheets

U.S. PATENT DOCUMENTS

| | | | |
|---|---|---|---|
| 6,765,557 B1 * | 7/2004 | Segal et al. | 345/173 |
| D504,677 S * | 5/2005 | Kaminski et al. | D14/218 |
| 6,897,849 B2 * | 5/2005 | Kim | 345/160 |
| 6,947,771 B2 * | 9/2005 | Guo et al. | 455/566 |
| D512,027 S * | 11/2005 | Sarasjoki et al. | D13/168 |
| 7,057,521 B1 * | 6/2006 | Beuk et al. | 340/825.56 |
| D524,296 S * | 7/2006 | Kita | D14/218 |
| D524,298 S * | 7/2006 | Hedderich et al. | D14/218 |
| D533,164 S * | 12/2006 | Knight et al. | D14/218 |
| D533,165 S * | 12/2006 | Knight et al. | D14/218 |
| 7,171,498 B2 * | 1/2007 | Tu et al. | 710/73 |
| D544,468 S * | 6/2007 | Anandpura et al. | D14/218 |
| 7,245,943 B2 * | 7/2007 | Ryu | 455/566 |
| D563,948 S * | 3/2008 | d'Hoore | D14/218 |
| 7,417,566 B2 * | 8/2008 | Pham | 341/22 |
| 7,530,031 B2 * | 5/2009 | Iwamura et al. | 715/864 |
| D594,850 S * | 6/2009 | Yan | D14/218 |
| 7,583,206 B2 * | 9/2009 | Volckers | 341/23 |
| D603,843 S * | 11/2009 | Einaudi et al. | D14/218 |
| 2003/0197736 A1 * | 10/2003 | Murphy | 345/780 |
| 2008/0158024 A1 * | 7/2008 | Steiner et al. | 341/34 |
| 2009/0033514 A1 * | 2/2009 | Yamagiwa et al. | 340/825.22 |
| 2009/0189789 A1 * | 7/2009 | Oh | 341/20 |
| 2009/0199092 A1 * | 8/2009 | Ghassabian | 715/261 |

FOREIGN PATENT DOCUMENTS

| | | |
|---|---|---|
| JP | 2001-325062 | 11/2001 |
| JP | 2002-312118 | 10/2002 |
| JP | 2003-150303 | 5/2003 |
| KR | 10-357013 | 10/2002 |
| KR | 2003-0029854 | 4/2003 |
| KR | 10-2003-0044129 | 6/2003 |
| KR | 10-2004-0029583 | 4/2004 |
| KR | 10-2004-0047302 | 6/2004 |
| KR | 10-2004-0066978 | 7/2004 |

OTHER PUBLICATIONS

Korean Office Action issued Nov. 9, 2006 in Korean Patent App. No. 10-2005-0095087.

* cited by examiner

FIG. 2
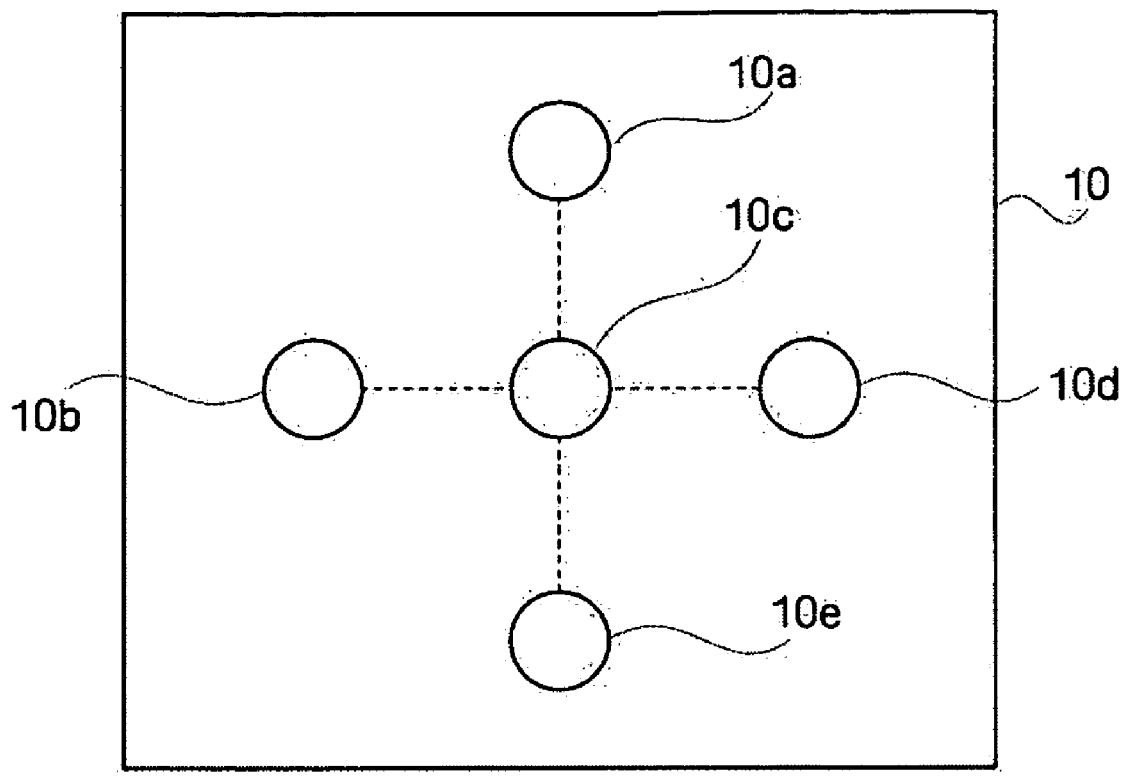
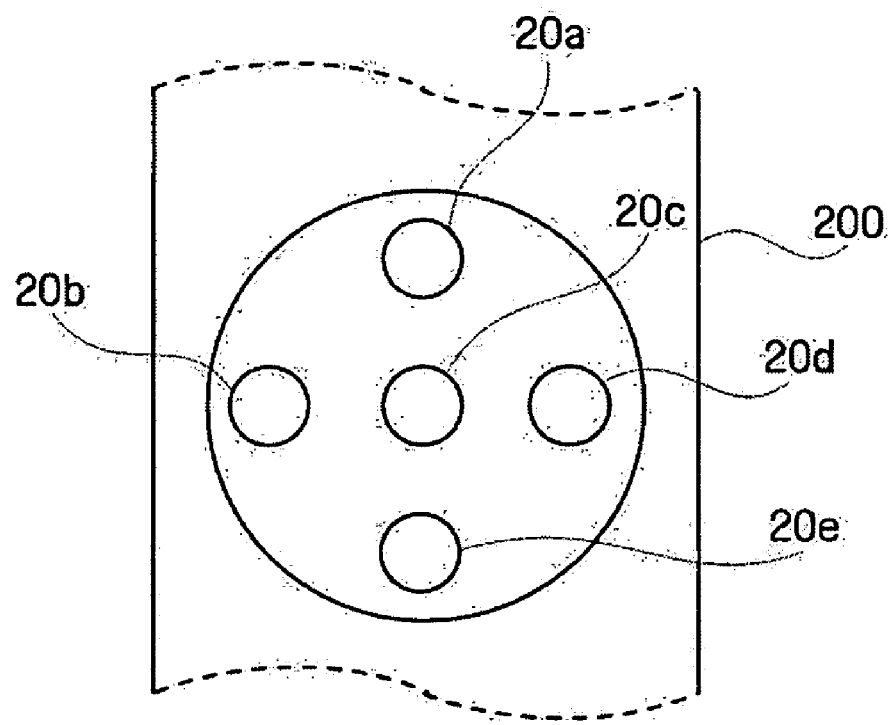

FIG. 8
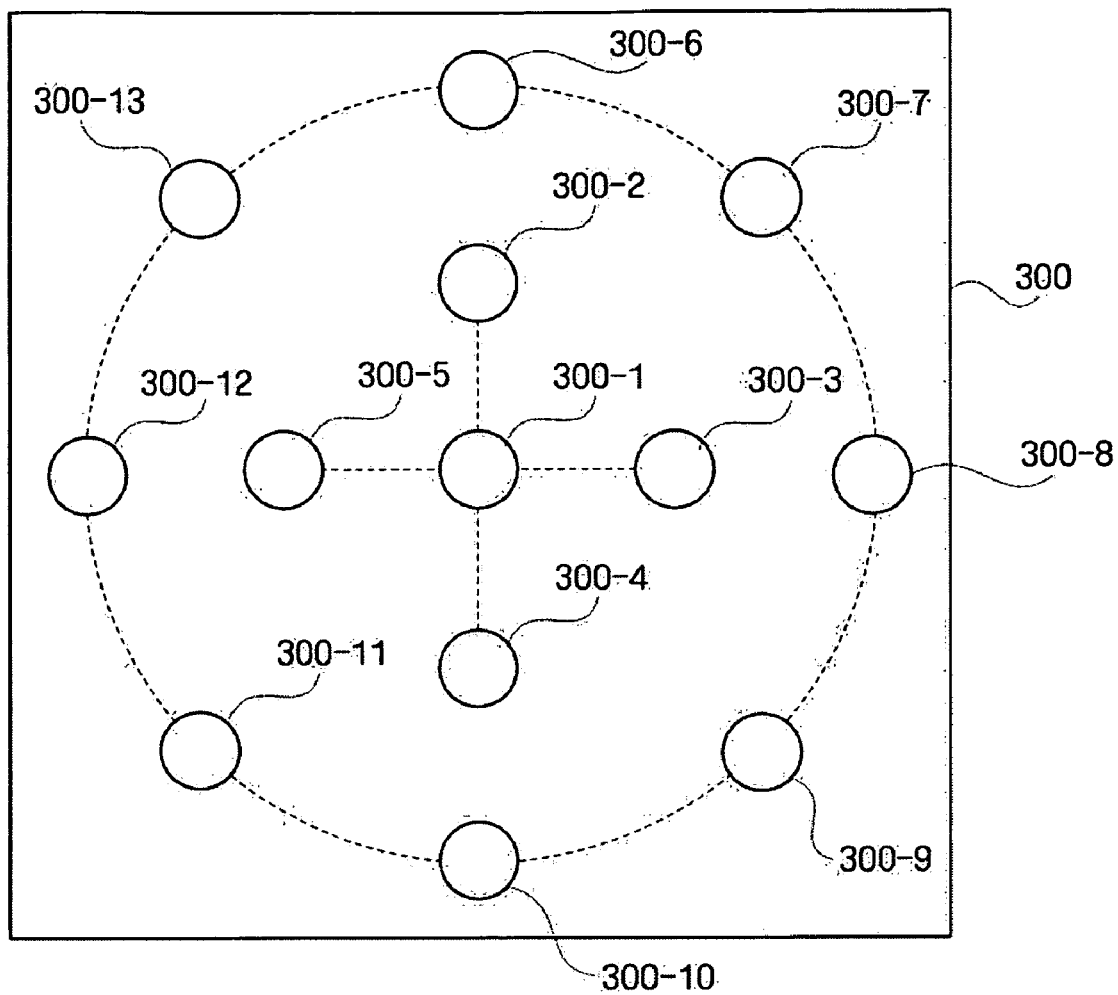
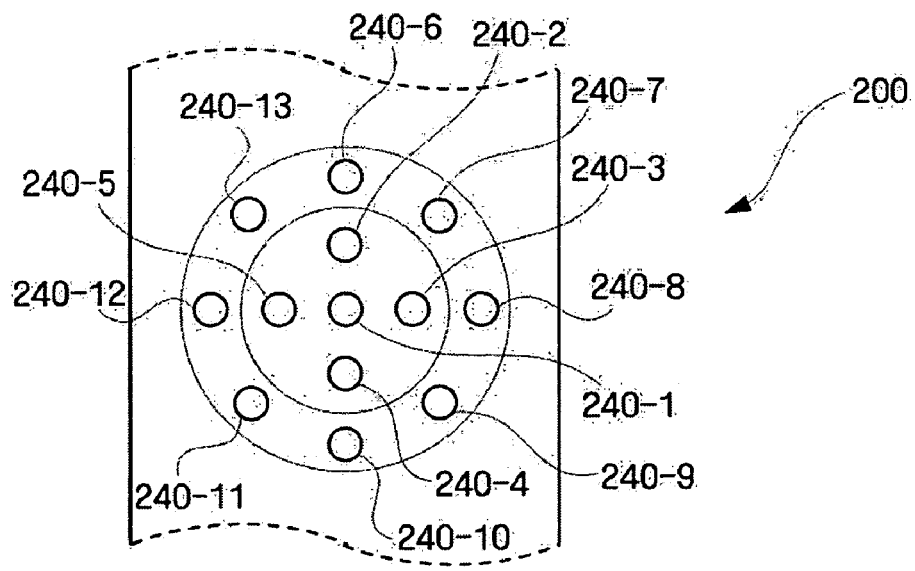

US 7,868,787 B2

CHARACTER-INPUT METHOD AND MEDIUM AND APPARATUS FOR THE SAME

CROSS-REFERENCE TO RELATED APPLICATIONS

This application claims the benefit of Korean Patent Application No. 10-2005-0095087 filed on Oct. 10, 2005, in the Korean Intellectual Property Office, the disclosure of which is incorporated herein by reference in its entirety.

BACKGROUND OF THE INVENTION

1. Field of the Invention

Methods, mediums, and apparatuses consistent with the present invention relate to character-input. More particularly, the present invention relates to a character-input method, medium, and an apparatus for improving an intuitive attribute of a button operation.

2. Description of the Related Art

As electronic technologies develop and various home appliances are provided with more functions, the number of buttons on remote controls increases and methods of using the remote controls become complicated. Accordingly, it takes considerable time for users to understand how to use a remote control, and most users use a remote control only to control basic functions of electronic devices (e.g., to adjust the volume or change the channel). In addition, even if a user understands how to control functions of electronic devices through the remote control, if the way of operating the remote control is inconvenient or complicated, the functions of the remote control will not be fully utilized.

Because such remote controls have been generally provided to remotely control electronic devices, there has not been a high demand for technologies for inputting characters through a remote control.

However, recently, as multimedia services become diversified and network communication technologies become developed, a demand for technologies for inputting characters to home appliances is increasing. Some examples include inputting a web page address in order to connect to the Internet through a digital TV and/or establishing a two-way service between a broadcasting station and a user in digital broadcasting. In order to satisfy such demands, if buttons for inputting characters are added to a remote control or a plurality of functions are added to one button, as mentioned above, the use of the remote control can become inconvenient or complicated, which is a problem. Therefore, there is a demand for a technology that allows a user to intuitively input characters and that does not restrict a user's sight when using a remote control.

In the conventional art, an input device has been developed in which each combination of direction buttons on a key pad and different modes represent alphanumeric characters of a unique group, by pushing the direction buttons of the key pad that can be pushed in a plurality of directions and by using the key pad to switch between a first mode and a second mode. This conventional art has reduced the number of buttons. However, there is a possibility that unwanted characters or words can be inputted due to the complexity of the operations performed using the keypad, and the user cannot confirm characters or words being inputted, which is a problem.

SUMMARY OF THE INVENTION

Additional aspects, features, and/or advantages of the invention will be set forth in part in the description which follows and, in part, will be apparent from the description, or may be learned by practice of the invention.

In an aspect of the present invention, there is provided a method, medium, and an apparatus having a more intuitive button operation for inputting characters.

According to an aspect of the present invention, there is provided a character-input method, including providing a plurality of objects having a predetermined structure, mapping characters included in a character group represented by a representative character mapped to an object identified as a first signal among objects to which representative characters are mapped, to one or more objects among the plurality of objects when the first signal is received from a user input device, and inputting characters mapped to an object identified as the second signal among objects to which the characters are mapped. Here, the representative character represents a predetermined character group, and is mapped to one or more objects among the plurality of objects.

According to an another aspect of the present invention, there is provided a device for providing a user-interface, including an object-providing module that provides a plurality of objects having a predetermined structure, a character-mapping module that maps characters included in a character group represented by a representative character mapped to an object identified as a first signal among objects to which representative characters are mapped, to one or more objects among the plurality of objects when the first signal is received from a user input device, a character-input module that inputs characters mapped to objects identified as a second signal among objects to which the characters are mapped if the second signal is received from the user input device, and an output module that outputs a user-interface which includes the plurality of objects provided by the object-providing module, the representative character and the character mapped by the character-mapping module, and characters inputted by the character-input module. Here, representative character is mapped to one or more objects among the plurality of objects having a predetermined structure.

According to another aspect of the present invention, there is provided a character-input method including mapping a representative character of a character group having a plurality of characters to an object identified by a first signal and mapping other characters of the character group to one or more objects, which have not been mapped to any representative characters; and inputting characters mapped to object identified by a second signal among objects to which representative characters are mapped or objects to which characters included in the character group are mapped.

According to another aspect of the present invention, there is provided at least one medium including computer readable instructions implementing methods of the present invention.

According to another aspect of the present invention, there is provided a user-interface-providing device including a character-mapping module that maps a representative character of a character group having a plurality of characters to an object identified by a first signal and maps other characters of the character group to one or more objects, which have not been mapped to any representative characters; a character-input module that inputs characters mapped to objects identified by a second signal among objects to which representative characters are mapped or objects to which the characters in the character group are mapped; and an output module that outputs a user-interface including objects to which representative characters are mapped and to which the characters in the character group are mapped.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 illustrates a button arrangement of a user input device and an object structure of the corresponding user-interface according to an exemplary embodiment of the present invention.

FIG. 8 illustrates a button arrangement of a user input device and a user-interface provided by a user-interface-providing device according to an exemplary embodiment of the present invention.

DETAILED DESCRIPTION OF THE PREFERRED EMBODIMENTS

Figure 1:
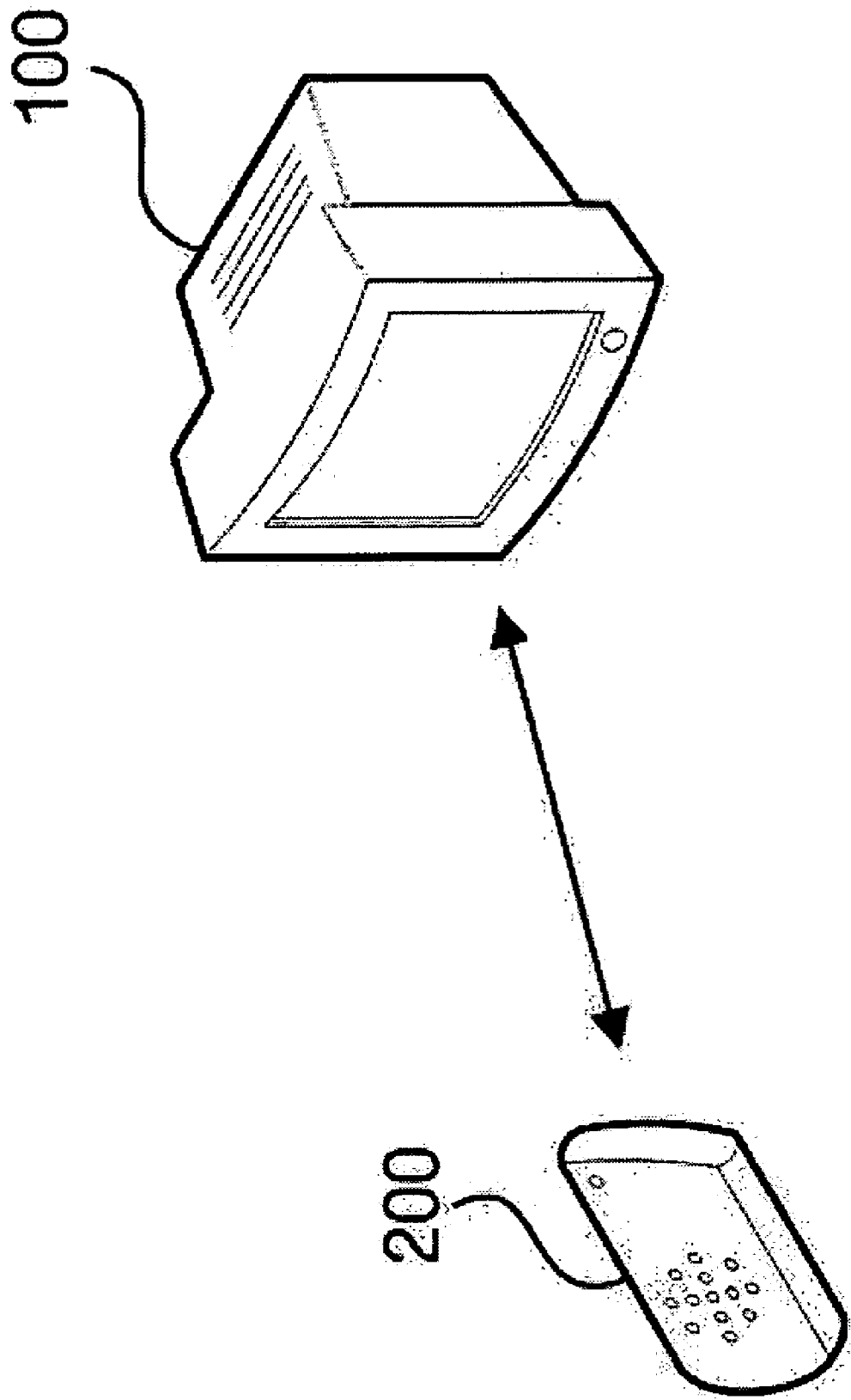
FIG. 1 illustrates a character-input system according to an exemplary embodiment of the present invention.

Exemplary embodiments of the present invention will be described in detail with reference to the accompanying drawings.

Aspects, advantages, and features of the present invention and methods of accomplishing the same may be understood more readily by reference to the following detailed description of exemplary embodiments and the accompanying drawings. The present invention may, however, be embodied in many different forms and should not be construed as being limited to exemplary embodiments set forth herein. Rather, these exemplary embodiments are provided so that this disclosure will be thorough and complete and will fully convey the concept of the invention to those skilled in the art. Like reference numerals refer to like elements throughout the specification.

FIG. 1 illustrates a character-input system according to an exemplary embodiment of the present invention.

The illustrated character-input system includes a user input device 200 that can be operated by a user and a user-interface-providing device 100 that provides a user-interface for inputting characters as a user operates the user input device.

Here, the user input device 200 and the user-interface-providing device 100 are controlled by a remote control and signals outputted from the remote control, respectively, and can be implemented as a home appliance (e.g., a TV) including a predetermined display. However, the present invention is not limited to this, and the user-interface-providing device 100 can be implemented as a home appliance (e.g., a set-top box) that can provide a predetermined user-interface to a device including a display according to signals outputted from a remote control even though the user-interface-providing device 100 does not include a display. Furthermore, the device can be implemented as a character-input device such as a mobile phone, a personal digital assistant (PDA), or a notebook computer, by an integration of a user input device 200 and a user-interface-providing device 100.

The user input device 200 includes a plurality of buttons, and a touch and a push of each button by a user can be sensed. In other words, the user input device 200 can output two signals, which are different from each other, for the same button. Therefore, the user can retrieve or select a character, which the user wants to input, by touching or pushing a button included in the user input device 200.

The user-interface-providing device 100 provides a user-interface that guides a character-input of a user, and the user-interface includes a plurality of objects. Here, an arrangement of a plurality of objects corresponds to an arrangement of a plurality of buttons included in the user input device 200. For example, as illustrated in FIG. 2, the user input device 200 includes 5 buttons 20a to 20e. If the arrangement of the buttons 20a to 20e is of cross type, a user-interface 10 provided by a user-interface-providing device 100 has the structure in which the 5 objects 10a to 10e are arranged in a cross type. In FIG. 2, each object 10a to 10e of a user-interface 10 respectively corresponds to buttons 20a to 20e included in the user input device.

The user-interface-providing device 100 classifies characters in predetermined groups according to predetermined conditions, and maps representative characters of each character group to a part or all the objects of the user-interface.

A character-input process according to the present invention can be roughly divided into a character-retrieving process and a character-selecting process. First, a user confirms objects, to which a representative character of a character group including a character wanted by a user is mapped in a user-interface, and touches a button corresponding to a confirmed object among buttons of the user input device 200. At this time, the user-interface-providing device 100 receives a signal signifying a touch of a certain button of the user input device 200, and maps characters included in a character group represented by a representative character mapped to an object corresponding to a touched button to one or more objects. Here, characters included in the character group can be mapped to an object to which an existing representative character was mapped, or can be mapped to an object to which the representative character was not mapped. Then, the user can confirm an object, to which a character which the user wants to input is mapped. This process is a character-retrieving process.

After confirming an object to which a character which the user wants to input is mapped, the user can push a button corresponding to a confirmed object among buttons of the user input device 200. At this time, the user-interface-providing device 100 receives a signal signifying a push of a certain button from the user input device 200 and inputs a character mapped to an object corresponding to a pushed button to a predetermined character-input area. This is a character-selecting process.

In the above exemplary embodiment, in a character-retrieving process, a button of the user input process 200 was touched, and in a character selecting process, a button of the user input device 200 was pushed. However, this is merely exemplary. Hence, an exemplary embodiment, in which a character is retrieved by pushing a button of the user input device 200 and a character is selected by touching a button of the user input device 200 is also possible.

Hereinafter, an exemplary embodiment of a character-input process according to the above explanation is explained by referring to FIGS. 3A to 3D. In this example, a user input device 200 having the same button as illustrated in FIG. 2 is used. Therefore, reference numerals used in explaining FIGS. 3A to 3D are same as reference numerals used in FIG. 2, and FIGS. 3A to 3D illustrate only a user-interface 10 provided by the user-interface-providing device 100. Also, in this example, the user-interface 10 guides the input of numbers 1 to 9.

Figure 3A:
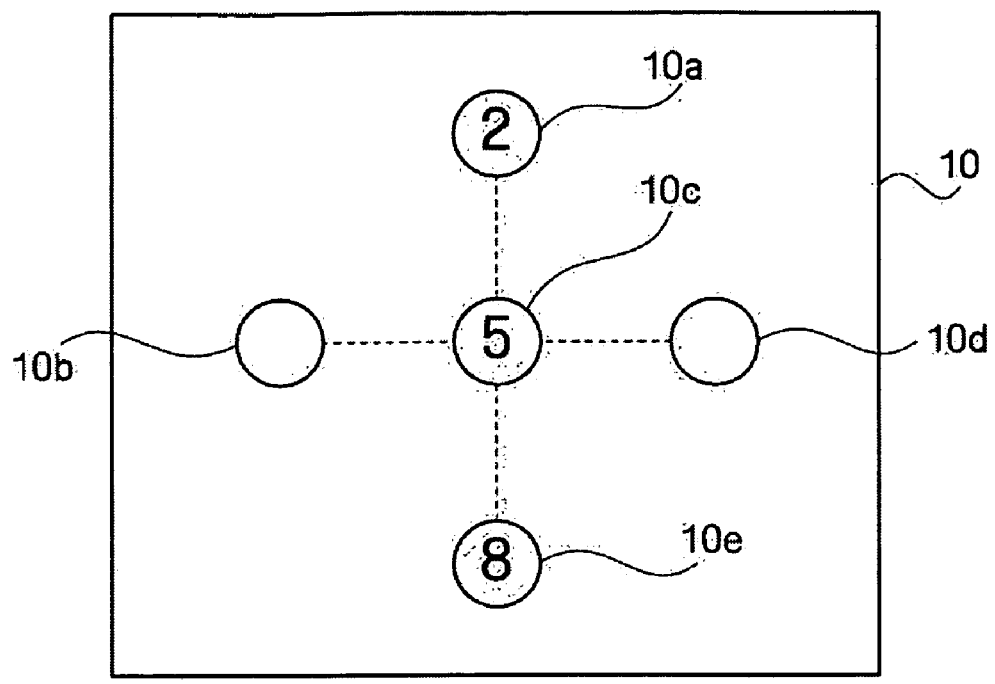
FIGS. 3A to 3D illustrate an example of a character-mapping in a user-interface according to an exemplary embodiment of the present invention.

First, the user-interface-providing device 100 saves 3 character groups that include 1 to 3, 4 to 6, and 7 to 9. If 2, 5, and 8 are used as representative characters of each group, the user input device 100 can provide the user-interface 10 as illustrated in FIG. 3A. FIG. 3A illustrates a case (example) where a representative character is mapped to objects 10*a*, 10*c*, 10*e* arranged in a vertical direction among 5 objects 10*a* to 10*e*. However, the representative character can also be mapped to another object.

Figure 3B:
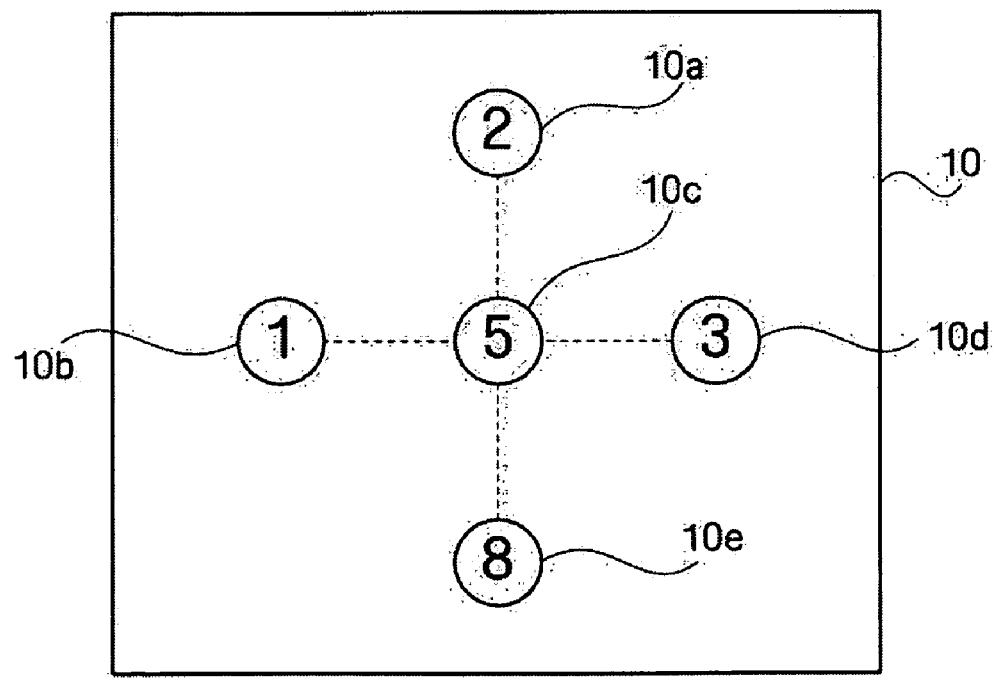

If a user touches a first button 20*a* of the user input device 200, the user-interface-providing device 100 can map characters 1, 2, 3 included in the same character group to a representative character 2 mapped to a first object 10*a* corresponding to a first button 20*a*. In this example, the user-interface-providing device 100 can also map characters 1 and 3 to a second object 10*b* and a fourth object 10*d*, to which representative characters have not been mapped, as illustrated in FIG. 3B, and the character 2 can be kept mapped to the first object 10*a*. However, depending on the exemplary embodiment, the user-interface-providing device 100 can map characters 1, 2, 3 to objects 10*a*, 10*c* and 10*e*, to which a representative character was mapped.

Figure 3C:
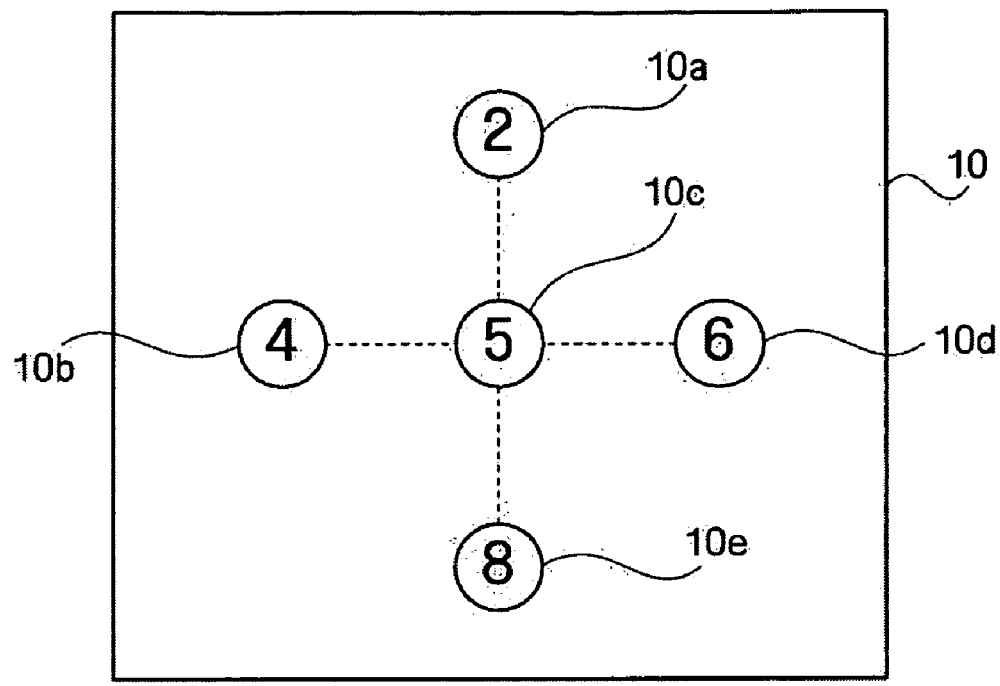
Figure 3D:
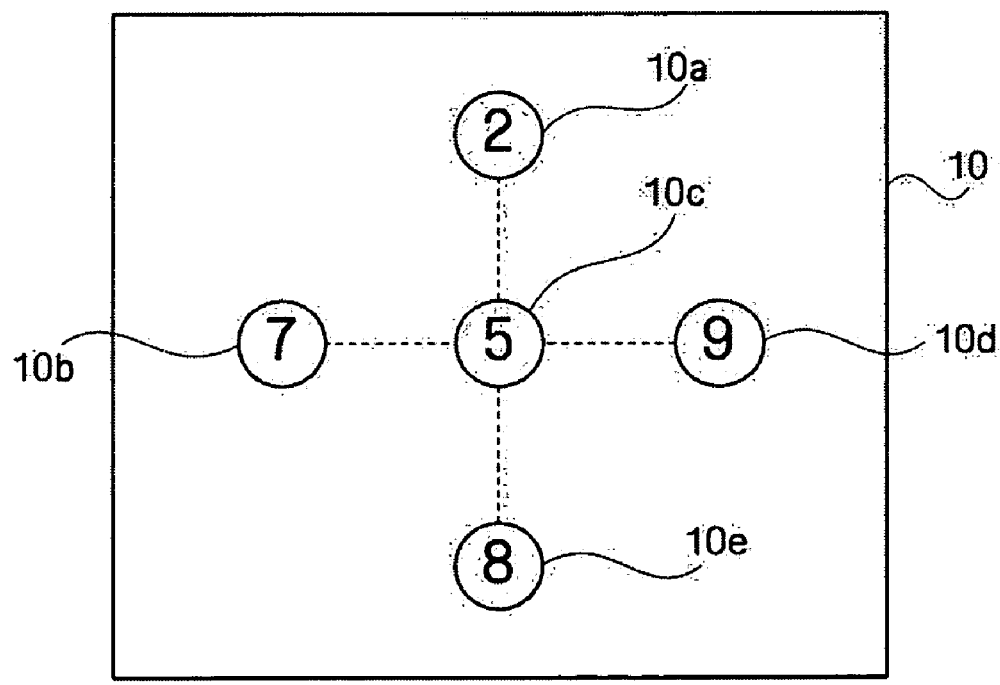

Similarly, if a user touches a third button 20*c* of a user input device 200, the user-interface-providing device 100 can provide a user-interface 10 that displays characters 4, 5, 6 included in a character group represented by a representative character 5 mapped to a third object 10*c* corresponding to a third button 20*c*, as illustrated in FIG. 3C. Also, if a user touches a fifth button 20*e* of the user input device 200, the user-interface-providing device 100 can provide a user-interface 10 that displays characters 7, 8, 9 included in a character group represented by a representative character 8 mapped to a fifth object 10*e* corresponding to a fifth button 20*e*, as illustrated in FIG. 3D. In this way, a number, which the user wants to input, can be retrieved.

Figure 4A:
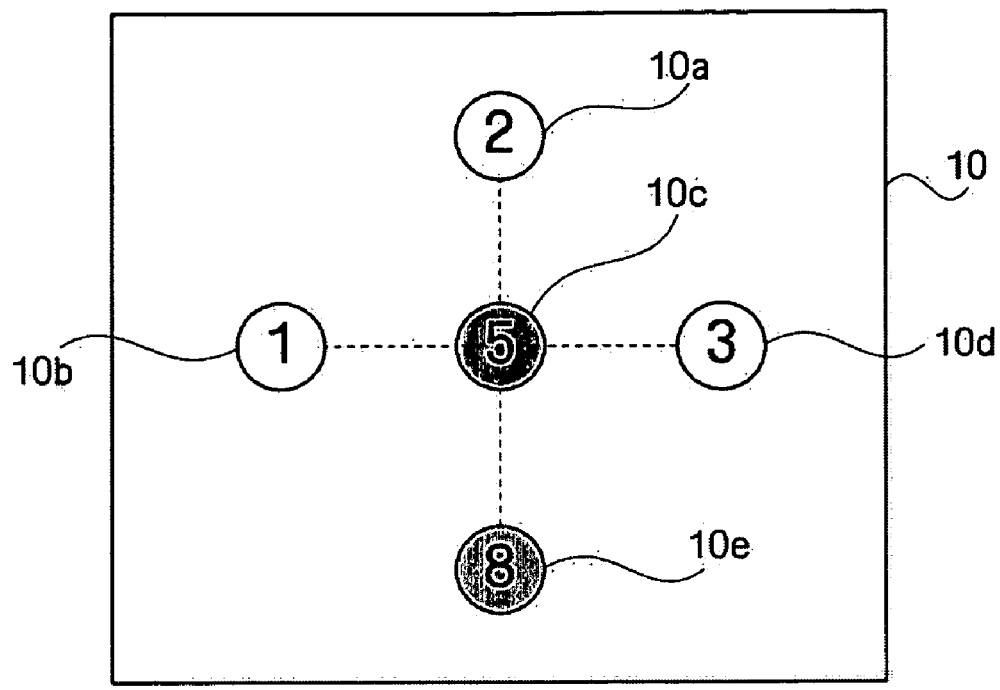
FIGS. 4A to 4C illustrate an example of a character-mapping in a user-interface according to another exemplary embodiment of the present invention.
Figure 4B:
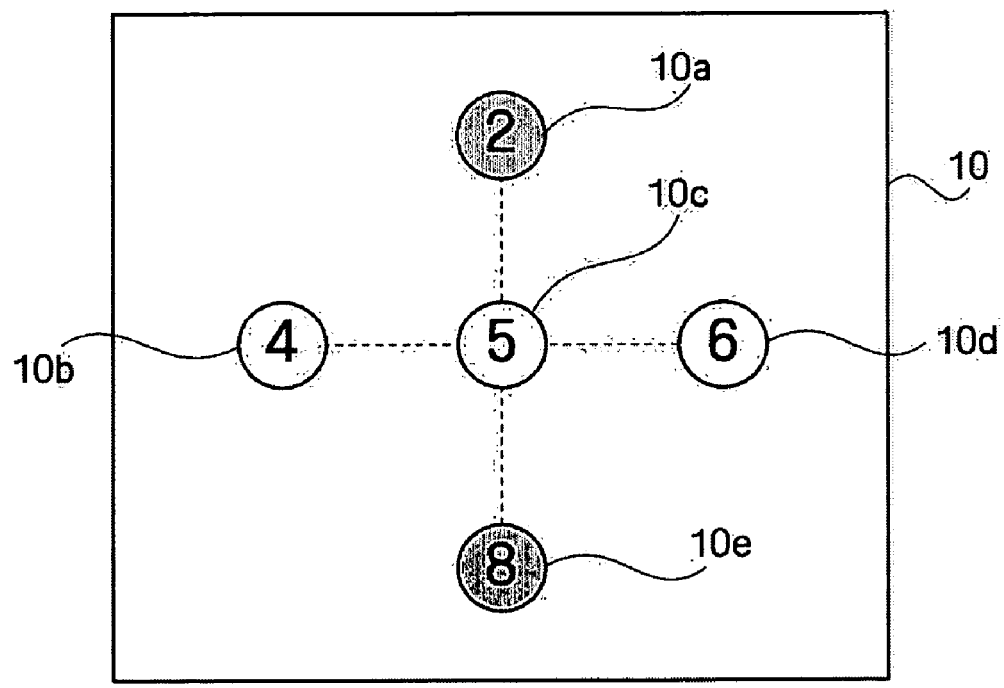
Figure 4C:
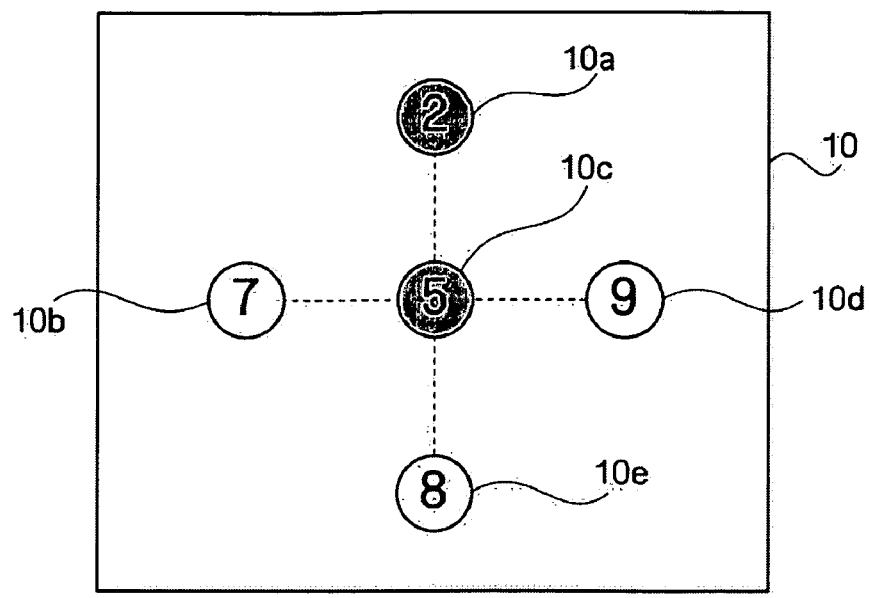

According to another embodiment of the present invention, if characters included in a character group represented by a representative character are mapped to objects, representative characters having been mapped to the predetermined object can improve the user-interface for retrieving characters by lowering visual effects or highlighting characters currently being retrieved. For example, when characters included in a character group represented by a representative character mapped to a button touched by a user as illustrated in FIGS. 4A to 4C, the representative characters can be shadowed.

Also, for example, if a user wants to input the number 3, after a button 20*a* is touched that corresponds to an object 10*a* to which the number 2, which is a representative character of a character group where the number 3 is included, is mapped among buttons included in the user input device 200, when a user-interface as illustrated in FIG. 3B is displayed, a button 20*d* corresponding to an object 10*d* to which the number 3 is mapped can be pushed. At this time, the user-interface-providing device 100 can input the number 3 to a predetermined character-input area (not shown). If a character that a user wants to input is a representative character, the user can input the character without a retrieving process by pushing a button corresponding to an object to which the representative character is mapped.

Hereinafter, the user-interface-providing device 100 and the user input device 200 according to an exemplary embodiment of the present invention will be explained in more detail.

Figure 5:
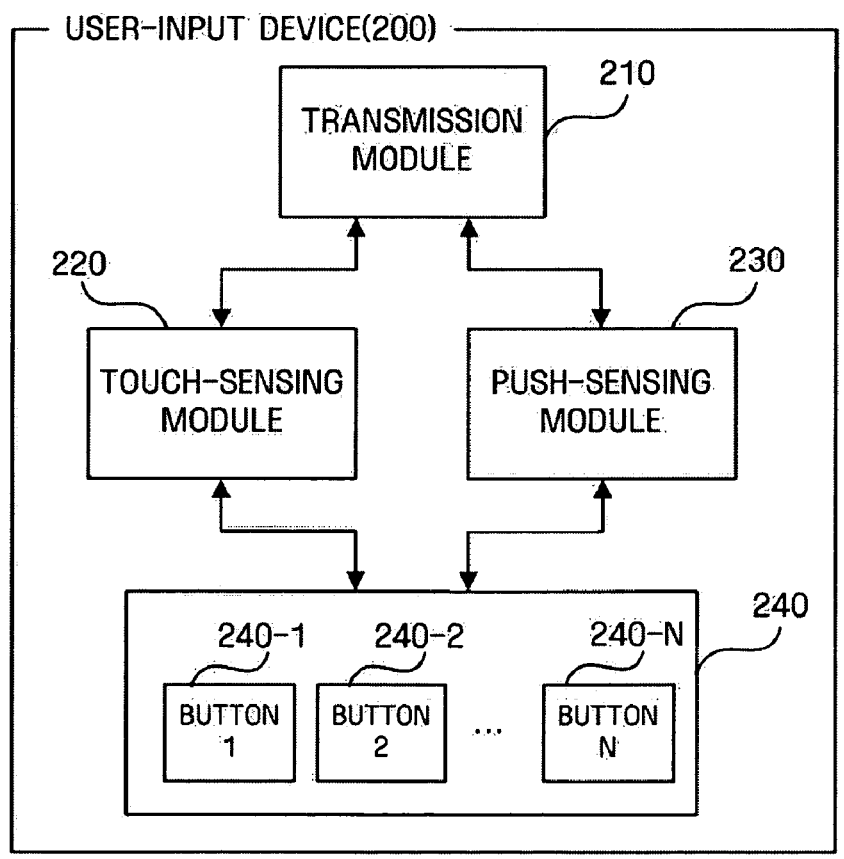
FIG. 5 is a block diagram illustrating a user input device according to an exemplary embodiment of the present invention.

FIG. 5 is a block diagram illustrating a user input device according to an exemplary embodiment of the present invention.

The illustrated user input device 200 includes a transmission module 210, a touch-sensing module 220, a push-sensing module 230, and a button module 240.

The button module 240 includes a plurality of buttons 240-1 to 240-N. The number and the arrangement of buttons can vary according to each exemplary embodiment. The button arrangement according to the exemplary embodiment of the present invention will be explained later by referring to FIG. 8. Meanwhile, the button module 240 can further include additional buttons in addition to the buttons having the arrangement corresponding to the arrangement of objects in the user-interface provided by the user-interface-providing device 100. The additional buttons can be used when the user-interface-providing device 200 requests execution of certain functions.

The touch-sensing module 220 senses a touch of a user on each button included in the button module 240. The touch-sensing module can be implemented through various forms of touch sensors. For example, a technology sensing a touch of a user in a touch pad or a touch screen can be applied to implement the touch-sensing module 220. According to an exemplary embodiment, the touch-sensing module 220 can include a plurality of touch sensors, and each touch sensor is installed on the surface of a button and can sense a touch by the user.

The push-sensing module 230 senses a push of a user on each button included in the button module 240. The push-sensing module can be implemented through various forms of pressure sensors. For example, a structure of a key pad used for inputting keys in a keyboard a mobile phone, a personal digital assistant, etc. can be applied to implement the push-sensing module 230. According to an exemplary embodiment, the push-sensing module 230 can include a plurality of pressure sensors, and each sensor is installed on the surface of a button and can sense a pressure if the user pushes a button with more than a certain amount of pressure.

Further, in another example, the push-sensing module 230 and the touch-sensing module 220 can also be implemented as an integrated module. In this case, the integrated module of the push-sensing module 230 and the touch-sensing module 220 can recognize a case when the amount of pressure applied to the button by a user is less than a predetermined critical value as a touch, and can recognize a case when the amount of pressure applied to the button by the user is a predetermined critical value or more.

The transmission module 210 outputs a predetermined signal corresponding to a push or a touch of a button if the push-sensing module 230 or the touch-sensing module 220 senses the push or the touch of the button. The transmission module 210 can save a signal corresponding to a touch and a push for each button in advance for the output, and based on the signal, a signal corresponding to the result sensed by the push-sensing module 230 and the touch-sensing module 220 can be outputted.

If the user input device 200 is, e.g., a remote control which is separated from the user-interface-providing device 100, a signal outputted by the transmission module 210 can be a wireless signal such as infrared rays, radio frequency (RF) signals, and others. However if the user input device 200 is connected via a wire to the user-interface-providing device 100 or exists as a single character-input device by a mutual integration, the signal outputted by the transmission module 210 can be an electrical signal that can be outputted through a predetermined wire medium.

Figure 6:
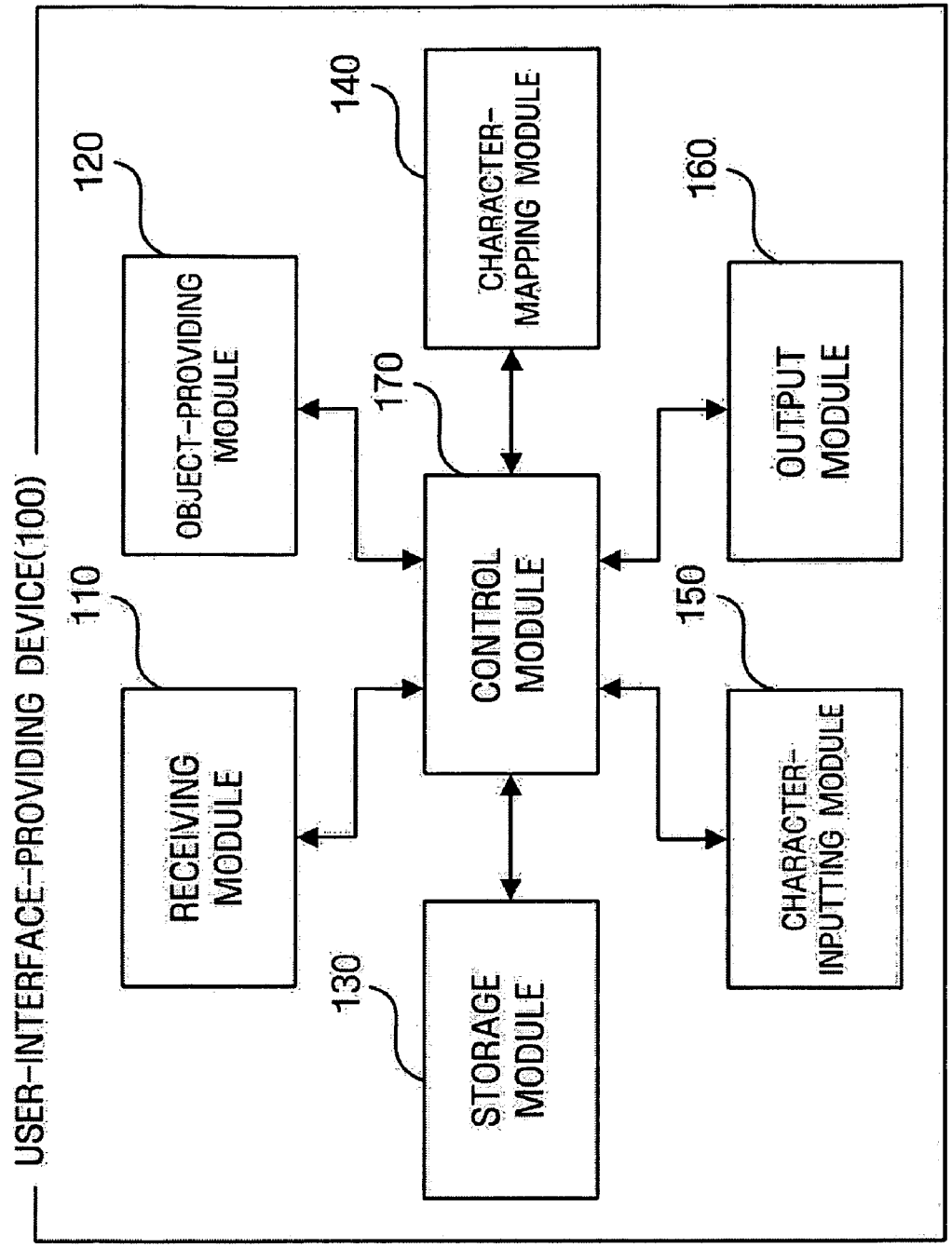
FIG. 6 is a block diagram illustrating a user-interface-providing device according to an exemplary embodiment of the present invention.

FIG. 6 is a block diagram illustrating a user-interface-providing device according to an exemplary embodiment of the present invention.

The illustrated user-interface-providing device 100 includes a receiving module 110, an object-providing module 120, a storage module 130, a character-mapping module 140, a character-inputting module 150, an output module 160, and a control module 170.

The receiving module 110 receives a signal outputted from the user input device 200. The receiving module 110 can use a method corresponding to a signal transmission method used by the transmission module 210 of the user input device 200.

The object-providing module 120 provides a plurality of objects included in a user-interface. In the present invention, an object can be implemented not only as a two-dimensional figure such as a circle, a quadrangle and others but also as a figure of various forms such as a three-dimensional icon. The arrangement of objects provided by the object-providing module 120 corresponds to the arrangement of buttons 240-1 to 240-N included in the user input device 200. An exemplary embodiment of the arrangement of objects provided by the object-providing module 120 will be explained later by referring to FIG. 8.

The storage module 130 stores one or more character groups. Each character group includes one or more characters, and a representative character of each character group is selected for each character group. In the present invention, a character may include one or more consonants and vowels of Hangeul (the Korean alphabet), the English alphabets, numbers, symbols and marks indicating other languages. A character group and a representative character can be set by the manufacturer when the user-interface-providing device 100 is manufactured. Also, after the production of the user-interface-providing device 100, a character group and a representative character can be saved or updated through software. A character constituting a character group saved by the storage module 130 or a representative character of the character group can be selected in various ways. The character group and the representative character of each character group according to an exemplary embodiment of the present invention will be explained later with reference to FIG. 8 and Table 1 to Table 4.

The character-mapping module 140 maps a representative character of each character group saved in the storage module 130 to one or more objects among a plurality of objects provided by the object-providing module 120. At this time, which representative character will be mapped to which object will be implemented in various ways according to exemplary embodiments. If a signal corresponding to a touch for a certain button from the user input device 200 is received, the character-mapping module 140 can map characters included in the character group represented by the representative character mapped to the object corresponding to the touched button to one or more objects among a plurality of objects provided by the object-providing module 120. At this time, for the mapping of characters included in the character group, objects to which representative characters have been mapped can be used, or objects to which representative characters have not been mapped can be used. The representative character and the mapping of the character according to an exemplary embodiment of the present invention will be explained by referring to FIGS. 9 to 19.

The character-input module 150 inputs characters mapped to the object corresponding to the pushed button when a signal corresponding to the push of a certain button is received from the user input device 200. For the input, the character-input module 150 can provide a predetermined character-input area, and characters within the character-input area can be inputted.

The output module 160 displays a plurality of objects provided by the object-providing module 120, a character mapped to an object by the character-mapping module 140, and a user-interface that includes a character-input area provided by the character-input module 150. At this time, characters mapped to the object can be directly displayed on the object as illustrated in FIG. 3, or they can be displayed in an area adjacent to the object. In order to display the user-interface, the output module 160 can be implemented by a display such as a cathode ray tube (CRT) display, a liquid crystal display (LCD), a thin film transistor (TFT) display, an organic electroluminescent (EL) display, and others. The output module 160 can also provide a user-interface to a predetermined display device existing separately from the user-interface-providing device 100.

The control module 170 controls operation of each module 110 to 160 constituting the user-interface-providing device 100. Also, the control module analyzes a signal received from the user input device 200 by the receiving module 110. Therefore, the control module can determine which button was operated by a user among buttons included in the user input device 200 and whether the operation method is a touch or a push.

A "module" in FIGS. 5 and 6 can refer to a software element or a hardware element such as a Field Programmable Gate Array (FPGA) or Application Specific Integrated Circuit (ASIC). The modules can reside in an addressable storage media or can reproduce one or more processors. Modules include software elements, object-oriented software elements, class elements, task elements, processes, functions, attributes, procedures, sub-routines, segments of program codes, drivers, firmware, microcode, circuits, data, databases, data structures, tables, arrays, and variables. The functions provided in the elements and modules can be combined into fewer elements and modules, or can be divided into additional elements and modules.

Figure 7:
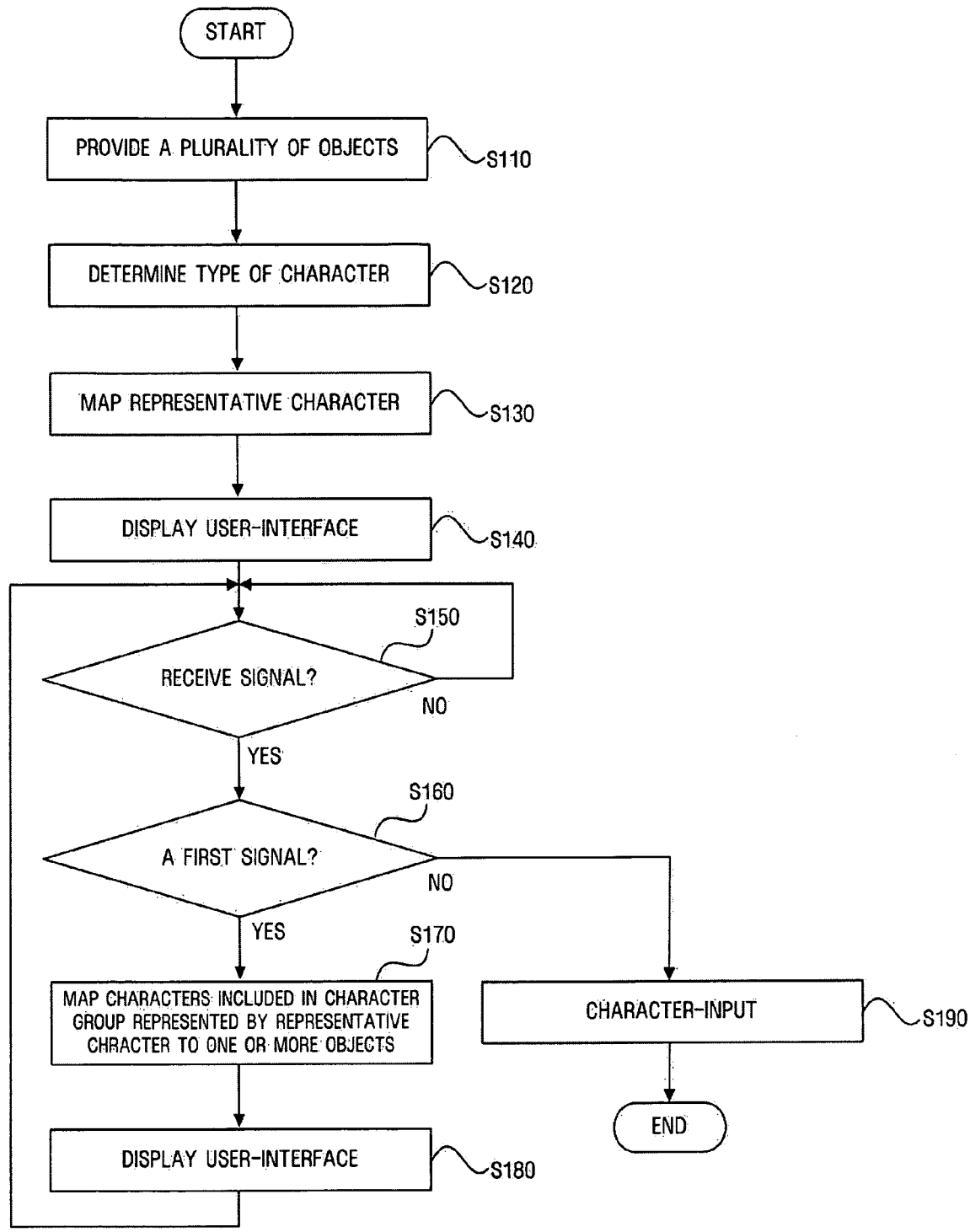
FIG. 7 is a flow chart illustrating a character-input method according an exemplary embodiment of the present invention.

FIG. 7 is a flow chart illustrating a character-input method according to an exemplary embodiment of the present invention.

First, an object-oriented module provides a plurality of objects having a predetermined arrangement (S110). Here the arrangement of the plurality of objects preferably has the arrangements that of the plurality of buttons included in the user input device 200.

Then, the control module determines the type of a character to be mapped to an object provided by the object-providing module 120 among marks indicating consonants of Hangeul, vowels of Hangeul, numbers, symbols, the English alphabet, and other languages (S120). Here, the determination of the type of character can be executed in various cases such as a case a signal mapped to a function button (not shown) included in the user input device 200 is received from the user input device 200, a case a user selects a certain character type by using the user input device 200 if a type of a character is presented through a predetermined menu screen provided in advance, and other cases.

Here, the character-mapping module 140 retrieves character groups consisting of characters of the type decided by the control module 170, and maps representative characters of the retrieved character group to one or more objects among a plurality of objects provided by the object-providing module 120 (S130).

Then, the output module 160 displays a user-interface that includes objects provided by the object-providing module 120 and characters mapped by the character-mapping module 160 (S140). Here, the representative character can be displayed on the object or can be displayed in an area adjacent to the object in parallel with the object. At the same time, the output module 160 can display a predetermined character-input area. The user retrieves and selects a character that he wants to input by operating the user input device 200 while confirming the user-interface.

If the receiving module 110 receives a predetermined signal from the user input device 200 (S150), the control module 170 determines whether the received signal is a first signal (S160). Here, the first signal is a signal signifying a character-retrieving request and a signal which is outputted by the transmission module 210 when the touch-sensing module 220 or the push-sensing module 230 of the user input device 200 senses a touch or a push of a user on a predetermined button included in the button module 240.

If the received signal is the first signal, the character-mapping module 140 retrieves a character group represented by a representative character mapped to an object identified through the first signal, and maps characters included in the retrieved character group to one or more objects among objects provided by the object-providing module 120 (S170). At this time, characters included in the retrieved character group can be mapped to an object to which a representative object was mapped in step S130 or can be mapped to an object to which the representative character was not mapped.

Then, the output module 160 displays a user-interface S180 including an object to which a character is mapped. Here, each character can be displayed on the object or can be displayed on an area adjacent to the object in parallel with the object. Also, the output module 160 can be displayed so that characters mapped in step S170 can be more highlighted than characters mapped in step S130 by regulating the color tone, size, brightness and others.

As a result of step S160, if the received signal is not the first signal but the second signal, the character-input module 150 inputs a predetermined character mapped to an object identified as the second signal (S190). Here, the second signal is a signal signifying a character-selecting request and a signal outputted by the transmission module 210 when the touch-sensing module 220 or the push-sensing module 230 senses a touch or a push by the user on a predetermined button included in the button module 240. As an exemplary embodiment, if the touch-sensing module 220 of the user input device 200 senses a touch by a user on a predetermined button included in the button module 240, the first signal is outputted, and if the push-sensing module 230 senses a push on a predetermined button included in the button module 240, the second signal can be outputted. As another exemplary embodiment, if the touch-sensing module 220 senses a touch of a user on a predetermined button included in the button module 240, the second signal is outputted, and if the push-sensing module 230 senses a push on a predetermined button included in the button module 240, the first signal can be outputted.

In addition, a character-inputted in step S190 can be a representative character mapped in step S130, or a character included in a character group represented by a predetermined representative group mapped in step S170.

Depending on the exemplary embodiment, steps S140 and S180 in FIG. 7 can be steps where the output module 160 outputs a user-interface to a predetermined display device.

Hereinafter, a user-interface and the character-input method according to an exemplary embodiment of the present invention will be explained by referring to FIGS. 8 to 19. However, the explanation below is an exemplary embodiment, and does not limit the present invention.

FIG. 8 illustrates a button arrangement of a user input device 200 and a user-interface 300 provided by a user-interface-providing device 100 according to an exemplary embodiment of the present invention.

As illustrated, the button arrangement of the user input device 200 is arranged in a way that 5 buttons 240-1 to 240-5 are of cross-form, and 8 buttons 240-6 to 240-13 arranged at regular intervals on a circumference containing buttons 240-1 to 240-5 arranged in cross-form. Further, 5 objects 300-1 to 300-5 are arranged in cross form on a user-interface 300, and 8 objects 300-6 to 300-13 are arranged at regular intervals on a circumference containing objects 300-1 to 300-5 arranged in cross form. Four objects 300-6, 300-8, 300-10, 300-12 among 8 objects 300-6 to 300-13 are preferably positioned on an extended line of a cross form formed by 5 objects 300-1 to 300-5 arranged inside the circumference.

A predetermined character can be inputted through the user input device 200 and the user-interface 300, and hereinafter, an exemplary embodiment for inputting Hangeul consonants and vowels, numbers, symbols and English letters will be explained. Also, cases where a character is retrieved when a user touches a button included in the user input device 200, and a character to be inputted is selected when the user pushes the button, will be explained. However, this is merely exemplary, and it is possible that when the user pushes the button included on the user input device 200, a character is retrieved, and when the user touches the button, the character is selected. For reference, identification marks for objects are omitted in FIGS. 9 to 14 and FIGS. 15 to 19, but the identification mark of each object mentioned in the below explanation can be understood by referring to FIG. 8.

Consonants of Hangeul

Consonants of Hangeul can be roughly divided into Pyung sounds (e.g., ㄱ, ㄴ, ㄷ, ㄹ, ㅁ, ㅂ, ㅅ, ㅇ, ㅈ, ㅎ; ㅎ is actually a Hu sound, but is classified as Pyung sound here.), Gyung sounds (e.g., ㄲ, ㄸ, ㅃ, ㅆ, ㅉ) and Gyuk sounds (ㅊ, ㅋ, ㅌ, ㅍ) A character group on Korean characters saved in a user-interface-providing device 100 according to an embodiment of the present invention and representative characters of each character group are described in Table 1.

TABLE 1

Groups of Korean Consonants

| Group | Consonant | Representative character |
|---|---|---|
| First group | ㄱ, ㄲ, ㅋ | ㄱ |
| Second group | ㄷ, ㄸ, ㅌ | ㄷ |
| Third group | ㅂ, ㅃ, ㅍ | ㅂ |
| Fourth group | ㅈ, ㅉ, ㅊ | ㅈ |
| Fifth group | ㅅ, ㅆ | ㅅ |
| Sixth group | ㄴ, ㄹ | ㄴ |
| Seventh group | ㅎ, ㅇ | ㅎ |
| Eighth group | ㅁ, ㅇ | ㅁ |

As shown in Table 1, in the present embodiment, first, consonants are classified to constitute character groups by mutually-connected consonants among Pyung sounds, Gyung sounds and Gyuk sounds, and representative characters among such character groups (the first group to the fifth group) are selected as Pyung sounds (ㄱ, ㄷ, ㅂ, ㅈ, ㅅ).

Further, Pyung sounds (ㄴ, ㄹ, ㅁ, ㅇ, ㅎ) having no connected Gyung sound or Gyuk sound can be classified to constitute character groups by predetermined numbers, and in the present embodiment, as described in Table 1, "ㄴ"and "ㄹ","ㅎ"and "ㅇ", and "ㅁ"and "ㅇ"are classified as each character group. Here, "ㅇ"belongs to two character groups (the seventh group and the eighth group), but only in the embodiment, so "ㅇ"can be removed from one character group. In character groups (the sixth group to the eighth group) consisting of Pyung sounds having no connected Gyung sound or Gyuk sound, representative characters can be randomly selected. In the present embodiment, "ㄴ","ㅎ"and "ㅁ"are selected as representative characters.

Figure 9:
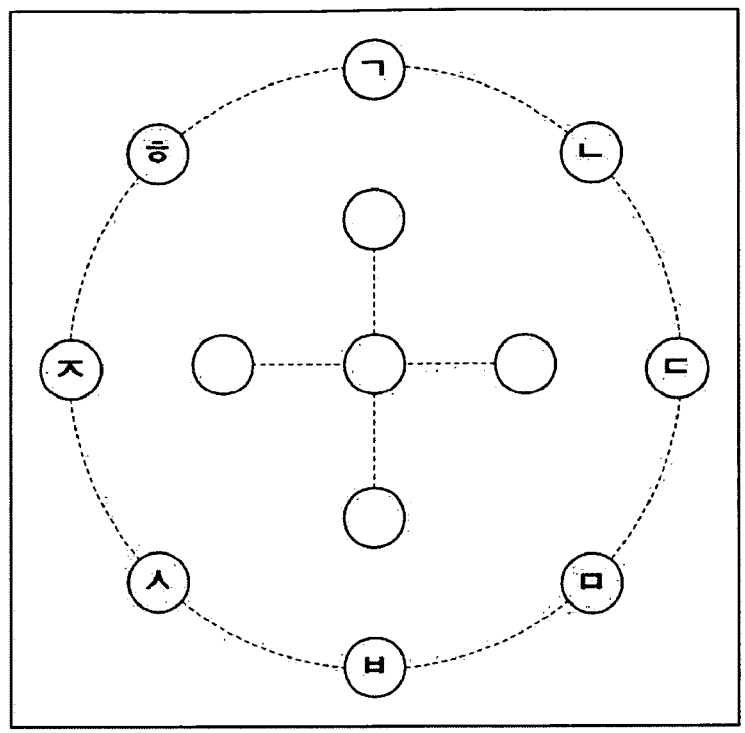
FIGS. 9 to 11 illustrate a state where consonants of Hangeul (the Korean alphabet) are mapped to an object of a user-interface.

A user-interface-providing device 100 saving character groups described in Table 1 and representative characters of each character group map representative characters to predetermined objects among 13 objects 300-1 to 300-13 on a user-interface 300, as illustrated in FIG. 8. Preferably, a representative character of each character group is respectively mapped to 8 objects 300-6 to 300-13 arranged on the circumference. More preferably, representative characters (ㄱ, ㄷ, ㅂ, ㅈ) of character groups (the first group to the fourth group) including all of Pyung sounds, Gyung sounds, and Gyuk sounds are mapped to objects 300-6, 300-8, 300-10, 300-12 located on a cross-type extended line formed by the arrangement of 5 objects 300-1 to 300-5 arranged within the circumference among 8 objects 300-6 to 300-13 arranged on the circumference, and the mapping is illustrated in FIG. 9. And remaining representative characters (ㄴ, ㅁ, ㅅ, ㅎ) can be randomly mapped to remaining objects 300-7, 300-9, 300-11, 300-13 among 8 objects 300-6 to 300-13 arranged on the circumference.

Through the user-interface, the user can confirm representative characters for Hangeul consonants, and consonants included in character groups represented by each representative character can be retrieved by touching buttons corresponding to objects to which each representative character is mapped among buttons 240-1 to 240-13 included in the user input device 200. At this time, consonants included in character groups represented by representative characters mapped to objects corresponding to buttons touched by a user can be mapped to 5 objects 300-1 to 300-5 arranged in cross-type. Preferably, if each object 300-6 to 300-13 on the circumference and the object 300-1 arranged in the center are connected, consonants included in each character group can be arranged through an object existing on the connection line.

Figure 10:
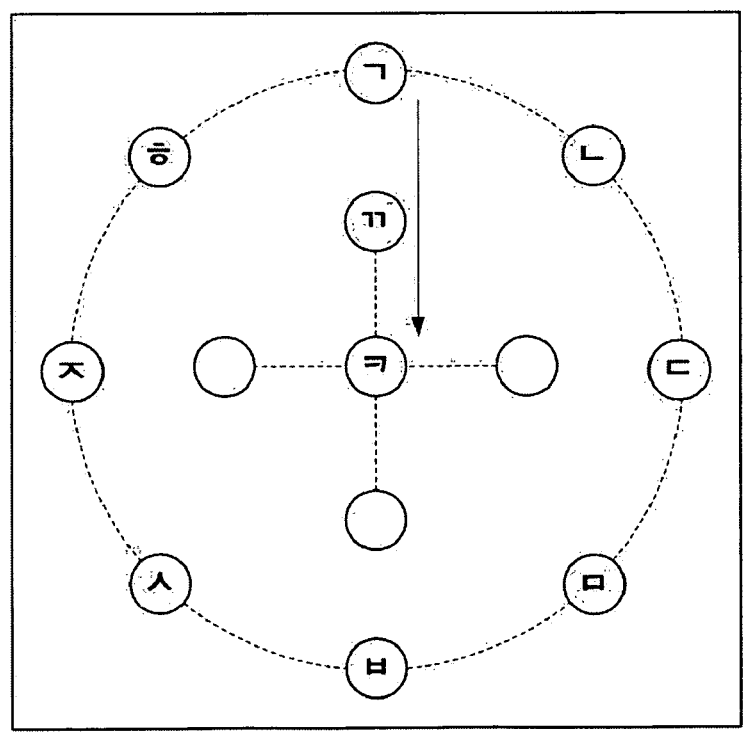

For example, in the state where a user-interface is provided as illustrated in FIG. 9, if a user touches the sixth button 240-6 of the user input device 200, the user-interface-providing device 100 can map consonants (ㄱ, ㄲ, ㅋ) included in the first group represented by "ㄱ"to the sixth object 300-6, the second object 300-2 and the first object 300-1. At this time, "ㄱ"a representative character, is mapped to the object 300-6 which was previously mapped, and remaining characters "ㄲ"and "ㅋ"can be mapped to the second object 300-2 and the first object 300-1, and the mapping is illustrated in FIG. 10.

Figure 11:
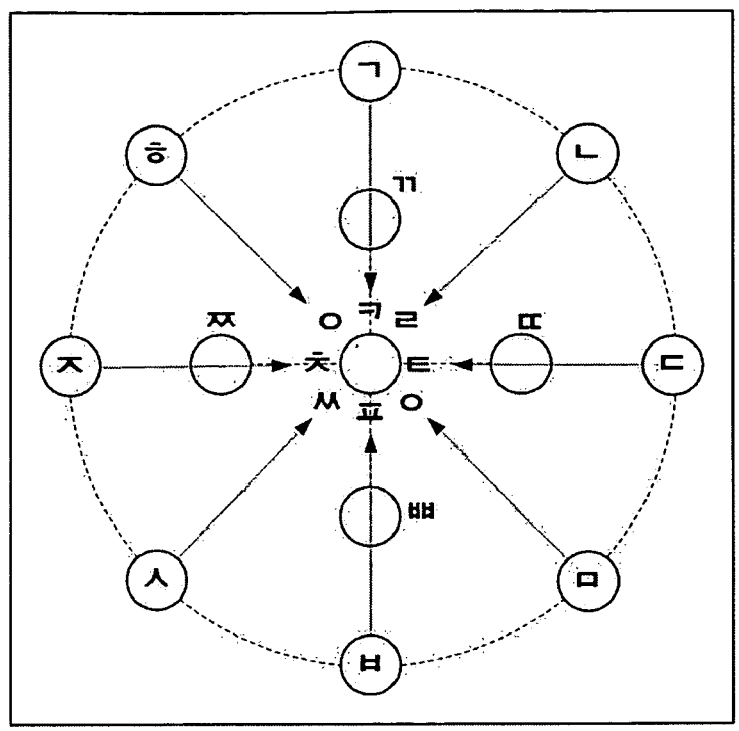

The user can retrieve remaining consonants in a similar way, and consonants which can be mapped to each object by touching buttons corresponding to objects to which representative characters are mapped are illustrated together in FIG. 11. As illustrated, the mapping state of consonants on 5 objects 300-1 to 300-5 arranged in a cross-type can be changed according to whether objects to which a certain representative character is mapped are activated by a button touch by a user.

Meanwhile, a user, who retrieved a desired consonant, can input the desired consonant by pushing a button corresponding to an object to which the retrieved consonant is mapped. For example, in the state where the user-interface 300 is provided as illustrated in FIG. 10, if the user pushes the first button 240-1 of the user input device 200, "ㅋ"a character mapped to the first object 300-1 corresponding to the first button 240-1 is input.

Vowels of Hangeul

Vowels of Hangeul can be formed by combinations of "ㅣ", "ㅡ" and "·". Character groups on vowels of Hangeul saved by the user-interface-providing device 100 and representative characters of each character group according to an embodiment of the present invention are described in Table 2.

TABLE 2

Groups of Korean Vowels

| Group | Vowels | Representative character |
|---|---|---|
| First group | ㅗ, ㅚ, ㅛ, ㅙ | ㅗ |
| Second group | ㅏ, ㅐ, ㅑ, ㅒ | ㅏ |
| Third group | ㅜ, ㅟ, ㅠ, ㅞ | ㅜ |
| Fourth group | ㅓ, ㅔ, ㅕ, ㅖ | ㅓ |
| Fifth group | ㅣ, ㅡ | ㅣ |

Character groups in Table 2 have a predetermined regularity, and vowels are grouped according to directions where "•" is added to "ㅣ"or "ㅡ". For example, in Table 2, the first group consists of vowels having a shape where "•" is added to the upper side of "ㅡ", and the third group consists of vowels having a shape where "•" is added to the lower side of "ㅡ". Also, in Table 2, the second group consists of vowels having a shape where "•" is added to the right side of "ㅣ", and the fourth group consists of vowels having a shape where "•" is added to the left side of "ㅣ". The fifth group includes "ㅣ"and "ㅡ"which are the basis for such groupings.

In Table 2, selected representative characters of the first to fourth group are "ㅗ", "ㅏ", "ㅜ", and "ㅓ" having a shape where "•" is added to "ㅣ"or "ㅡ", which are reference characters. Also, in case of the fifth group, "ㅣ"is selected as a representative character. The vowel "ㅢ"can be included in a random group among the first to fifth group, but in the present embodiment, the vowel is included in the second group (not illustrated in Table 2).

Character groups, as illustrated in Table 2, and the user-interface-providing device 100 saving representative characters of each character group map representative characters to predetermined objects among 13 objects 300-1 to 300-13 on the user-interface 300, as illustrated in FIG. 8. Preferably, representative characters of each character group of vowels of Hangeul can be mapped to 5 objects 300-1 to 300-5 arranged in a cross type within the circumference. More preferably, among 5 objects 300-1 to 300-5 arranged in a cross type, a representative character "ㅣ" is mapped, and representative characters "ㅗ","ㅏ","ㅜ", and "ㅓ" can be mapped to objects 300-2 to 300-5 of the direction corresponding to the direction where "•" is added to vowels "ㅣ" or "ㅡ" based on the object 300-1 to which "ㅣ" is mapped, and this mapping is shown in FIG. 12.

Through the user-interface, the user can confirm representative characters on Hangeul vowels, and vowels included in character groups represented by each representative character can be retrieved among buttons 240-1 to 240-13 included in the user input device 200. At this time, vowels represented by representative characters mapped to objects corresponding to buttons touched by a user can be mapped to 8 objects 300-6 to 300-13 arranged on the circumference. Preferably, characters included in each character group can be mapped to 3 objects from the closest object to the furthest object from the object to which the representative character was mapped among 8 objects 300-6 to 300-13 arranged on the circumference.

Figure 12:
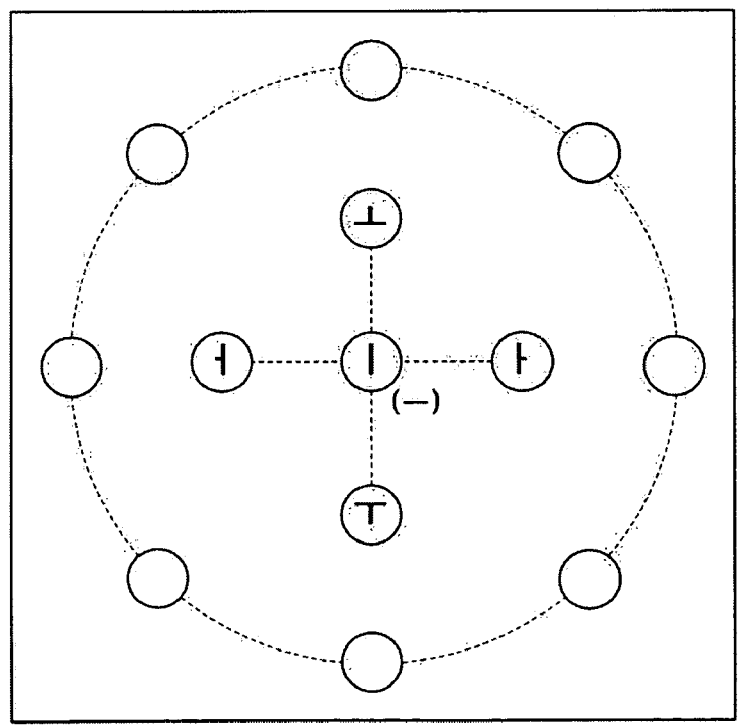
FIGS. 12 to 14 illustrate a state where vowels of Hangeul are mapped to an object of a user-interface according to an exemplary embodiment of the present invention.
Figure 13:
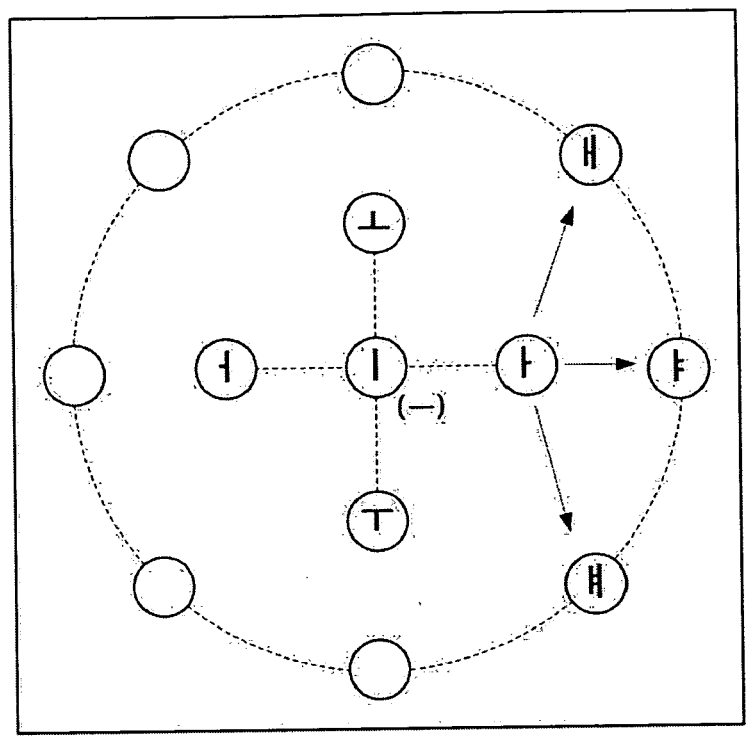

For example, in the state where the user-interface is provided as illustrated in FIG. 12, if the user touches the third button 240-3 of the user input device 200, the user-interface-providing device 100 can map vowels (ㅏ, ㅐ, ㅑ, ㅒ) included in the second group represented by the representative character "ㅏ" mapped to the third object 300-3 corresponding to the third button to the third object 300-3, the seventh object 300-7, the eighth object 300-8, and the ninth object 300-9. At this time, the representative object "ㅏ" is mapped to the existing mapped object 300-3, and remaining objects "ㅐ", "ㅑ", and "ㅒ" can be mapped to the seventh object 300-7, the eighth object 300-8, and the ninth object 300-9, and this mapping is illustrated in FIG. 13.

Figure 14:
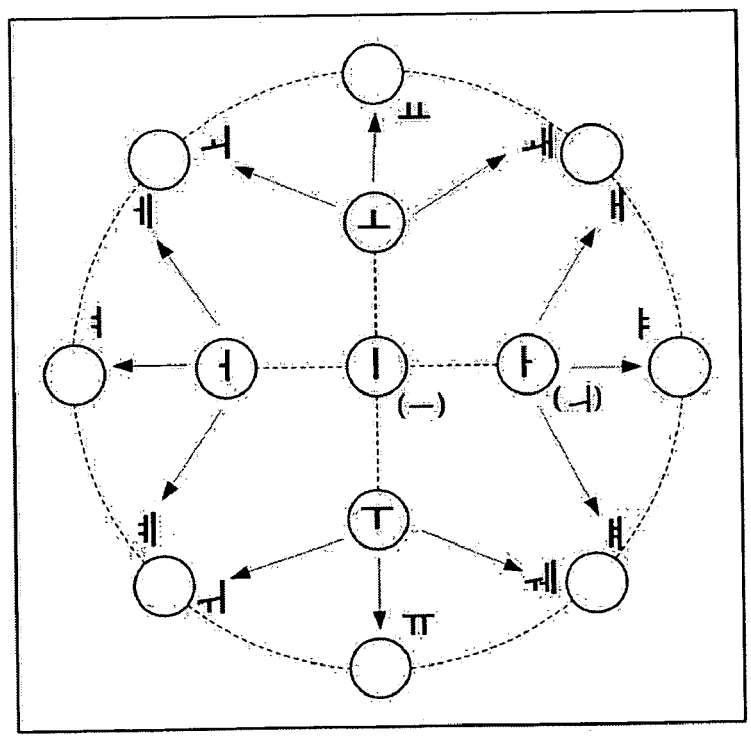

The user can retrieve remaining vowels in a similar way, and vowels, which can be mapped to each object by touching buttons corresponding to objects to which the representative character is mapped, are illustrated together in FIG. 14. As illustrated, according to whether the object to which a certain character is mapped is activated by the button touch of a user, the mapping state of vowels on 8 objects 300-6 to 300-13 can be changed.

Meanwhile, "ㅢ" can be mapped together with other vowels to a random object. In the present embodiment, because the vowel "ㅢ" is included in the second group as explained with reference to Table 2, "ㅢ" can be mapped to the same object along with one among vowels "ㅏ","ㅐ","ㅑ","ㅒ". For example, the vowel "ㅢ" can be mapped to the third object 300-3 along with the vowel "ㅏ".

The user who retrieved desired vowels, can input the desired vowels by pushing buttons corresponding to objects to which retrieved vowels are mapped. For example, in the state where the user-interface 300 is provided as illustrated in FIG. 13, if the user pushes the eighth button 240-8 of the user input device 200, the character "ㅏ" mapped to the eighth object 300-8 corresponding to the eighth button 300-8 is inputted. Also, in the case where two vowels are mapped to one object, additionally-mapped vowels can be inputted by pushing buttons corresponding to the object two times consecutively. For example, in FIG. 12, the vowel "ㅡ" along with "ㅣ" are mapped to the first object 300-1, and if the user pushes the first button 240-1 corresponding to the first object 300-1 one time, the vowel "ㅣ" is inputted, and if the first button 240-1 is pushed two times, the vowel "ㅡ" can inputted. In a similar way, the user can input the vowel "ㅢ" mapped to the same object as the vowel "ㅏ"

Figure 15:
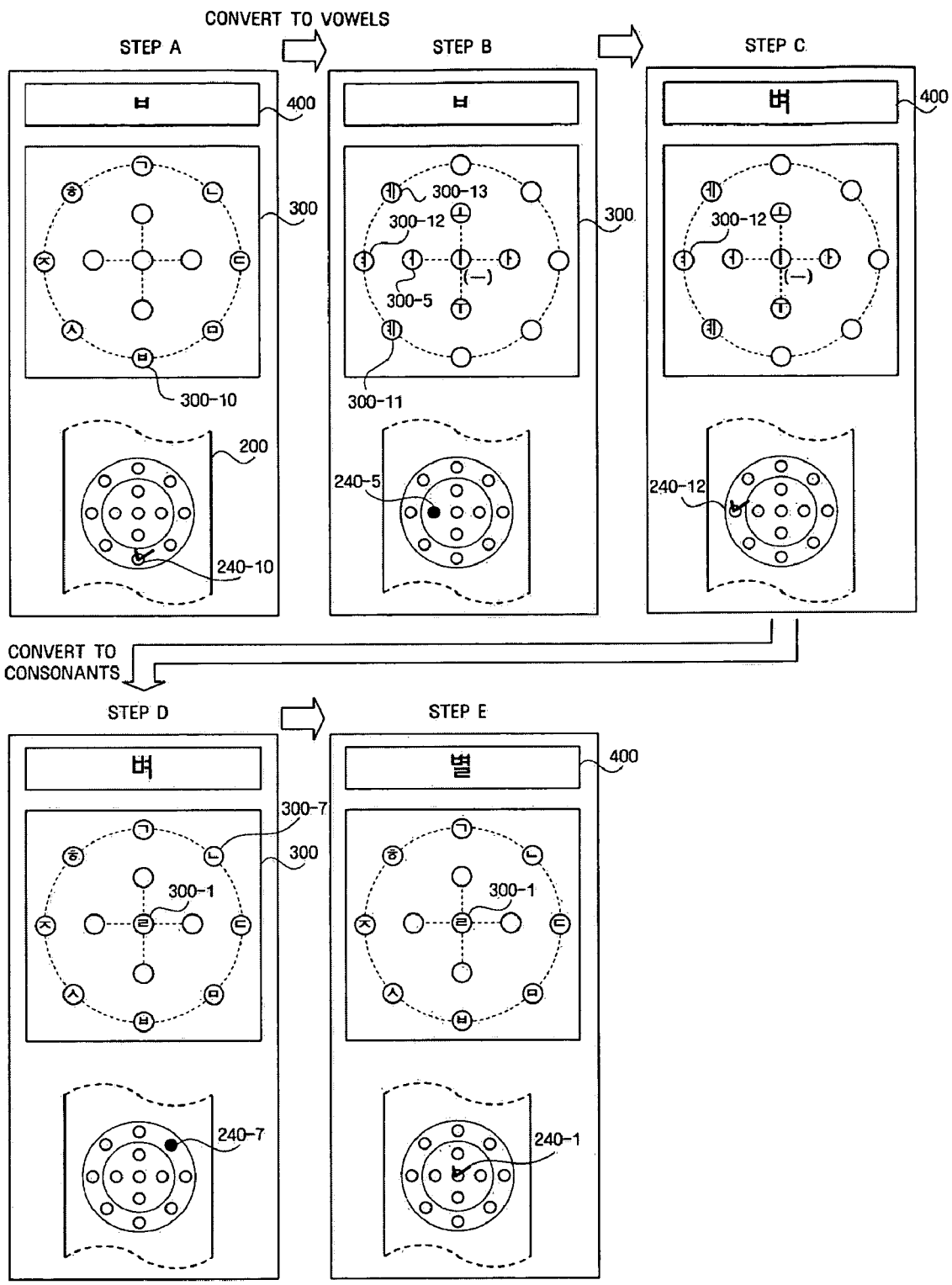
FIG. 15 illustrates a Hangeul input process according to an exemplary embodiment of the present invention.

Consonants and vowels can be inputted according to the above-described method, and the process of inputting completed words is shown in FIG. 15. FIG. 15 illustrates a process that inputs a word "뷁" and the character-input area 400, the guide area 300 on which a plurality of objects are displayed, and the user input device 200 including a plurality of buttons are illustrated. The character-input area 400 and the guide area 300 can be displayed to a user as one user-interface. Meanwhile, in the illustrated example, the button filled with black color among buttons of the user input device 200 indicates a button touched by a user, and a button having a mark ✓ indicates a button pushed by a user. The character group of consonants and vowels used in inputting characters, and representative characters are shown in Tables 1 and 2, and processes of retrieving and selecting characters have been explained by referring to FIGS. 9 to 14.

First, the user confirms representative characters through the guide area 300 to which consonants of Hangeul are mapped (a). Because "ㅂ" is mapped to the tenth object 300-10, the user can push the tenth button 240-10 corresponding to the tenth object 300-10 without passing through a separate character-retrieving process, and as a result, the consonant "ㅂ" is inputted in the character-input area 400.

Then, the guide area to which vowels of Hangeul are mapped can be provided. The process where the guide area, to which consonants of Hangeul are mapped, is changed into a guide area, to which vowels of Hangeul are mapped, can be implemented by various embodiments such as a case where a user operates predetermined function buttons included in the user input device 200, a case where the user operates a button corresponding to objects to which representative characters of the character group on consonants have not been mapped, and other cases.

If the guide area 300 to which vowels of Hangeul are mapped is provided, the user confirms the fifth object 300-5, to which the representative character "ㅓ" is mapped (b), and the fifth button 240-5 corresponding to the guide fifth object is touched. At this time, "ㅔ","ㅕ" and "ㅖ", "ㅢ" and "ㅚ","ㅝ" and "ㅞ" included in the character group represented by the representative character "ㅓ" are respectively mapped to the eleventh object 300-11 to the thirteenth object 300-13 in the guide area 300.

If the user pushes the twelfth button 240-12 corresponding to the twelfth object 300-12 to which the vowel "ㅢ" is mapped (c), the vowel "ㅢ" is inputted to the character-input area 400.

Then, the guide area 300, to which consonants of Hangeul are mapped, is provided. The process where the guide area, to which vowels of Hangeul are mapped, is changed into the guide area to which consonants of Hangeul are mapped can be implemented by various embodiments such as the case where a user operates a predetermined function button included in the user input device 200, a case where the user operates a button corresponding to the object to which representative characters of the character group on vowels have not been mapped, and a case where vowels are inputted to the character-input area 400.

The user confirms the seventh object 300-7, to which the representative character "ㅁ" is mapped, and touches the seventh button 240-7 corresponding to the seventh object 300-7

(d). At this time, the consonant "ㄹ" included in the character group represented by the representative character "ㅁ" is mapped to the first object 300-1 in the guide area 300.

If the user pushes the first button 240-1 corresponding to the first object 300-1 to which the consonant "ㄹ" is mapped (e), the vowel "ㄹ" is inputted to the character-input area 400.

Numbers and Symbols

Character groups of numbers saved by the user-interface-providing device 100 and representative characters of each character group according to an embodiment of the present invention are described in Table 3.

TABLE 3

Groups of Numbers

| Group | Number | Representative character |
|---|---|---|
| First group | 0, 1 | 0 |
| Second group | 2, 3, 4 | 3 |
| Third group | 5, 6, 7 | 6 |
| Fourth group | 8, 9 | 9 |

The user-interface-providing device 100 saving character groups and representative characters of each character group as illustrated in Table 3 maps representative characters to predetermined objects among 13 objects 300-1 to 300-13 on the user-interface 300 as illustrated in FIG. 8. Preferably, the representative characters 0, 3, 6, 9 of each character group can be mapped to 4 objects 300-6, 300-8, 300-10, 300-12 on the cross-type extended line formed by the arrangement of objects 300-1 to 300-5 within the circumference among 8 objects 300-6 to 300-13 arranged on the circumference. This mapping is described in FIG. 16.

Figure 16:
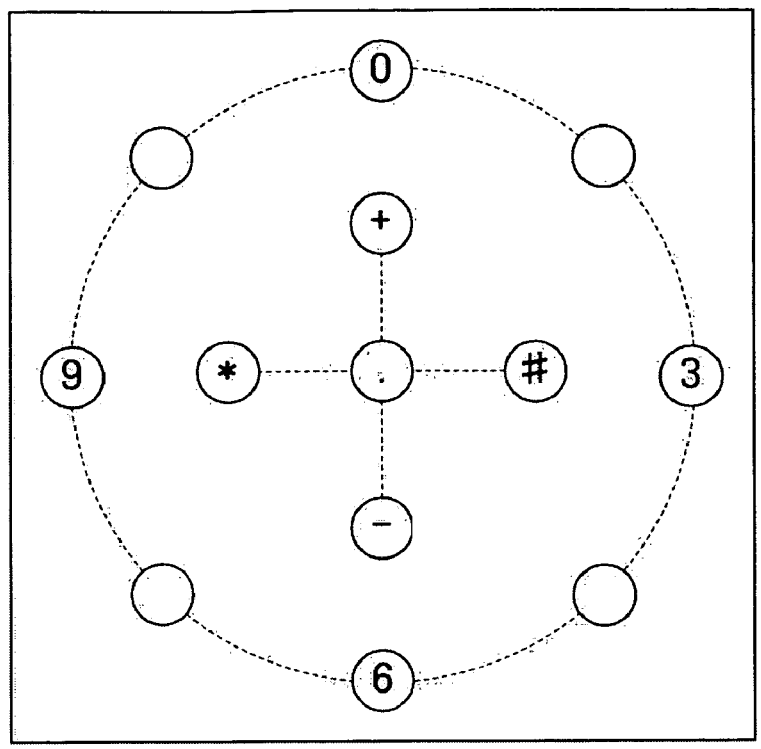
FIGS. 16 to 18 illustrate a state where numbers and symbols are mapped to an object of a user-interface according to an exemplary embodiment of the present invention.

As illustrated in FIG. 16, objects 300-6, 300-8, 300-10, 300-12, to which each representative character is mapped, correspond to the 12 o'clock, 3 o'clock, 6 o'clock and 9 o'clock directions, and because the mapped representative characters are also "0", "3", "6" and "9", the user can recognize the user-interface, whereby the user can retrieve numbers more easily.

The user can retrieve numbers included in the character group represented by each representative character by touching buttons corresponding to objects to which each representative character is mapped among buttons included in user input device 200. Here, numbers included in the character group represented by the representative character can be mapped so that the numbers can be increased in the clockwise direction through objects located at the left/right sides of objects corresponding to buttons touched by the user among the objects 300-6 to 300-13 arranged on the circumference.

Figure 17:
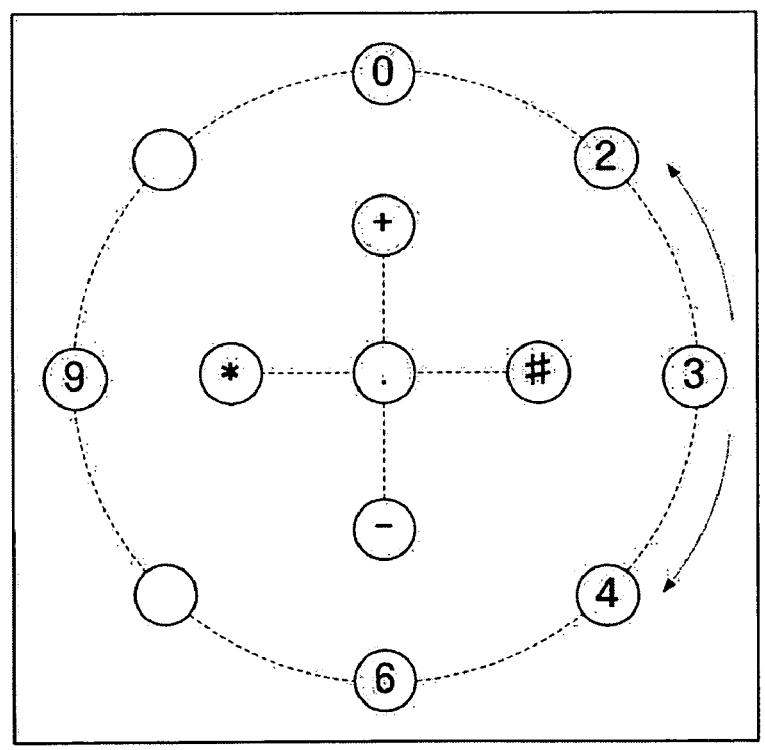

For example, in the state the user-interface is provided as illustrated in FIG. 16, if the user touches the eighth button 240-8 of the user input device 200, the user-interface-providing device 100 can map numbers 2, 3, and 4 included in the first group represented by the representative character "3" mapped to the eighth object 300-8 corresponding to the eighth button 240-8 to the seventh object 300-7 and the ninth object 300-9, respectively. In other words, the representative "3" is mapped to the object 300-8 which has been mapped, and the remaining numbers "2" and "4" can be mapped to the seventh object 300-7 and the ninth object 300-9. This mapping is illustrated in FIG. 17.

Figure 18:
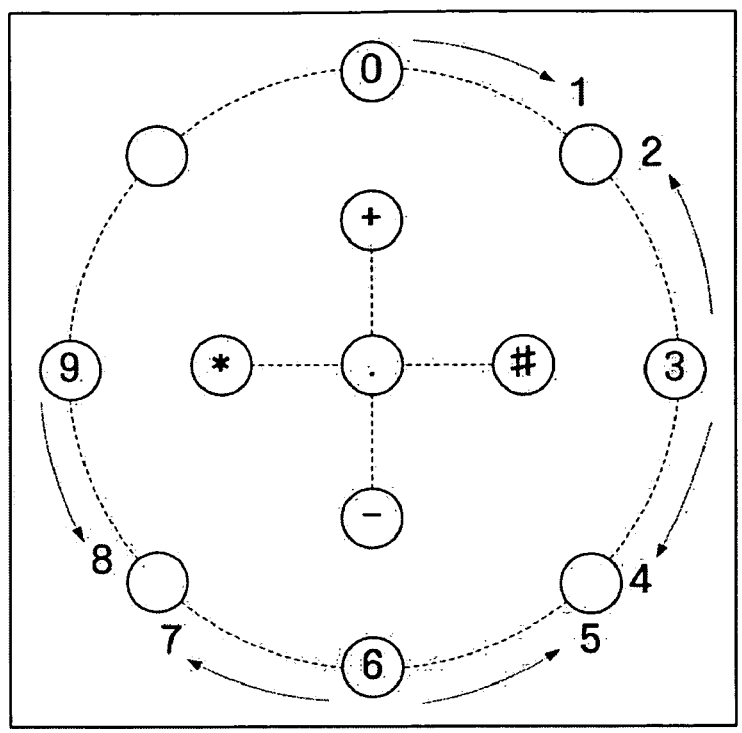

The user can retrieve remaining numbers in a similar way, and the numbers, which can be mapped to each object by touching buttons corresponding to objects to which representative characters are mapped, are described together in FIG. 18.

As illustrated, the mapping state of numbers on 8 objects 300-6 to 300-13 arranged on the circumference can be changed according to whether objects mapped to a certain representative character are activated by the button touch of a user.

The user who retrieved desired numbers can input desired numbers by pushing buttons corresponding to objects to which retrieved numbers are mapped. For example, in the state where the user-interface is provided as illustrated in FIG. 17, if the user pushes the seventh button 240-7 of the user input device 200. "2", the number mapped to the seventh object 300-7 corresponding to the seventh button 240-7, is inputted.

Also, numbers representing 10 units, 100 units and others can be inputted by applying the above-mentioned number input method. For example, if there is an operation (a touch or a push) by a user on the button corresponding to a certain object among objects to which representative characters have not been mapped, numbers on the user-interface illustrated in FIGS. 16 to 18 can be changed to 10 units, 100 units, and others.

Predetermined symbols (□, +, #, -, ') are mapped to 5 objects 300-1 to 300-5 arranged in a cross type in FIG. 16, and the user can input wanted symbols by pushing the button corresponding to each object. However, this mapping is for illustration, and more symbols can be retrieved and selected through the form that representative characters of each character group on symbols are mapped to predetermined objects.

English Letters

Character groups on alphabets saved by the user-interface-providing device 100 and representative characters of each character group according to an exemplary embodiment of the present invention are shown in Table 4.

TABLE 4

Groups of English Letters

| Group | Letter | Representative Character |
|---|---|---|
| First group | a, b, c | 2 |
| Second group | d, e, f | 3 |
| Third group | g, h, i | 4 |
| Fourth group | j, k, l | 5 |
| Fifth group | m, n, o | 6 |
| Sixth group | p, q, r, s | 7 |
| Seventh group | t, u, v | 8 |
| Eighth group | w, x y, z | 9 |

As shown in Table 4, in the present embodiment, numbers are used as representative characters of the letter group. The representative characters correspond to mapping information between letters and numbers commonly used in well-known several character-input devices. For example, a plurality of alphabets are mapped to each number button included in a mobile phone, a personal digital assistant (PDA), or a notebook computer and the relationship between each representative character and letters included in each character group accords with the mapping.

The character groups, as illustrated in Table 4 and the user-interface-providing device 100 saving representative characters of each character group map representative characters to predetermined objects among 13 objects 300-1 to 300-13 on the user-interface 300, as illustrated in FIG. 8. Preferably, representative characters of each character group can be mapped to 8 objects 300-6 to 300-13 arranged on the circumference. More preferably, representative characters of each character group can be mapped as illustrated in FIG. 19 so that the user-interface is in the form of a clock.

Figure 19:
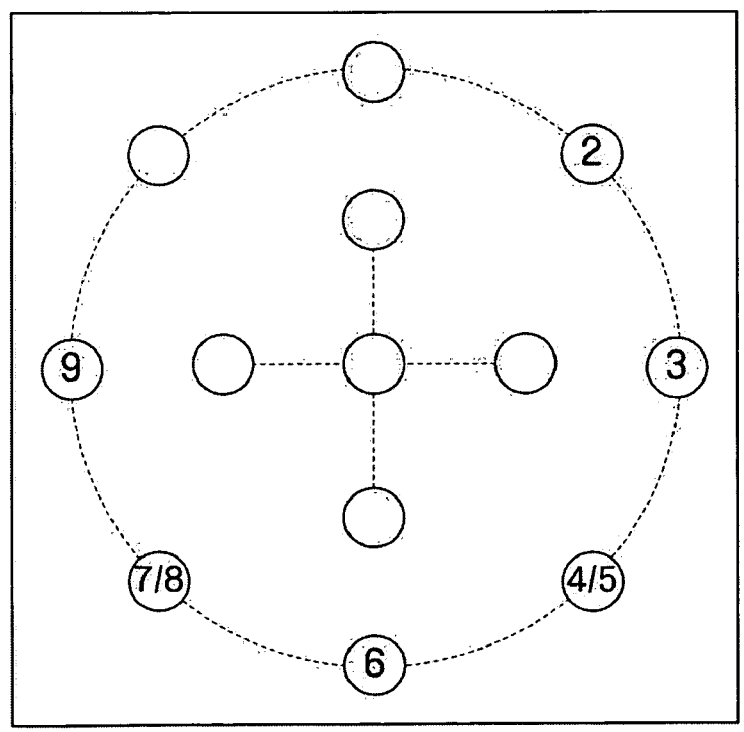
FIGS. 19 to 20 illustrate a state where letters of the English alphabet are mapped to an object of a user-interface according to an exemplary embodiment of the present invention.

According to the illustration of FIG. 19, "3", "6" and "9" are mapped to the eighth object 300-8, the tenth object 300-10, and the twelfth object 300-12, respectively, remaining representative characters 2, 4, 5, 7, 8 can be mapped so that numbers can increase in the clockwise direction through remaining objects on the circumference. Here, representative characters "4" and "5", and representative characters "7" and "8" can be mapped to the same objects 300-9 and 300-11, respectively.

Figure 20:
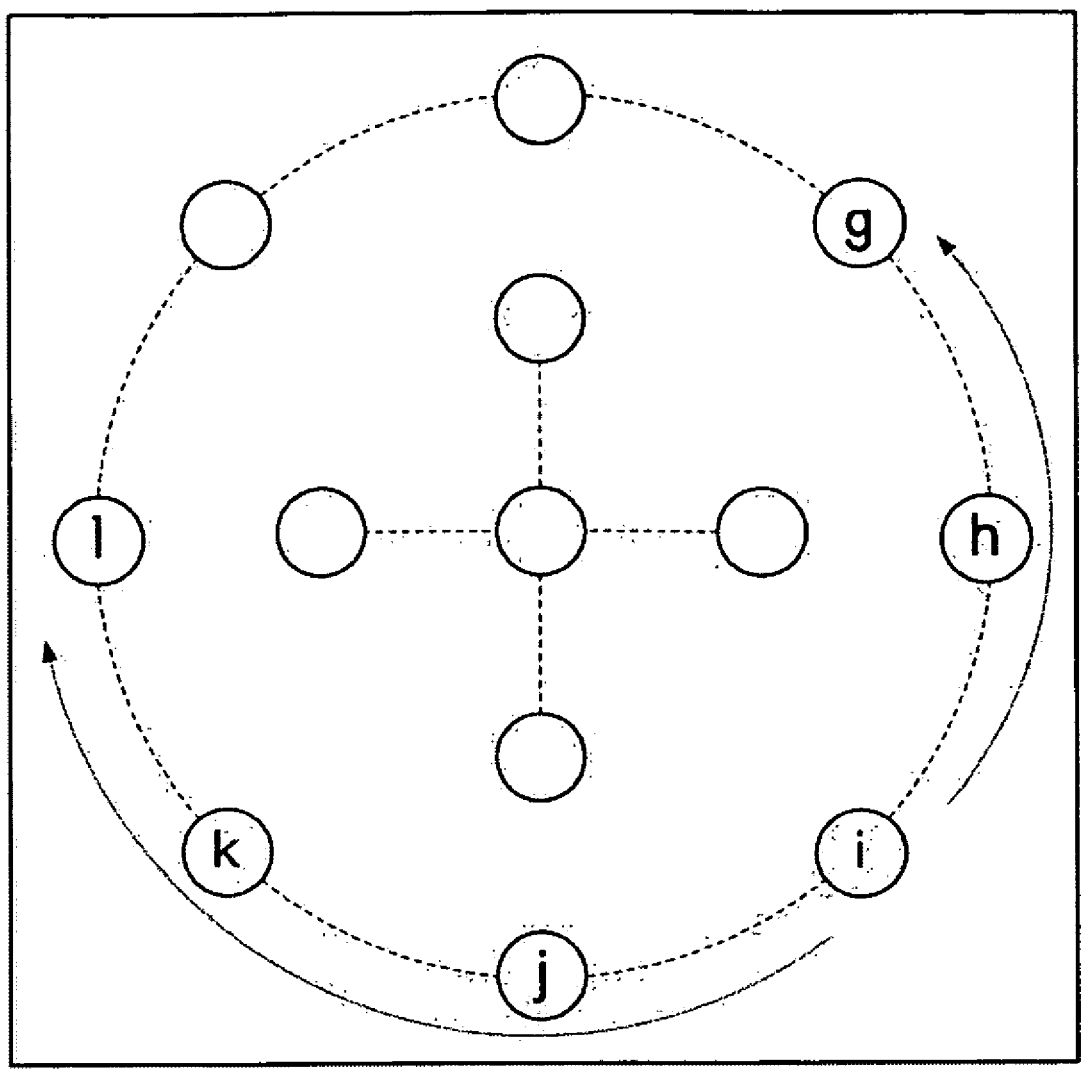

Here, letters included in the character group represented by the representative character can be mapped to objects located on the left/right sides of objects corresponding to buttons touched by the user. For example, if the user touches the ninth button 240-9, letters g, h, i, j, k, and l included in the character group represented by representative characters "4" and "5" mapped to the ninth object 300-9 corresponding to the ninth button 240-9 can be mapped to objects located at the left/right sides of the ninth object 300-9 among objects 300-6 to 300-13 arranged on the circumference. This mapping is illustrated in FIG. 20. The user can retrieve remaining letters in a similar way. The user-interface in the state where representative characters are mapped can be displayed as illustrated in FIG. 19 by operating separate function buttons (not illustrated) included in the user input device 200 or by operation a certain button among 5 buttons 240-1 to 240-5 arranged in a cross form within the circumference.

Further, the user, who retrieved desired letters, can input desired letters by pushing buttons corresponding to objects to which retrieved letters are mapped. For example, if the user pushes the seventh button 240-7 of the user input device 200 in the state the user-interface is provided as illustrated in FIG. 20, the letter "g" mapped to the seventh object 300-7 corresponding to the seventh button 240-7 is inputted.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc.). The medium/media may also be a distributed network, so that the computer readable code/instructions is stored and executed in a distributed fashion. The computer readable code/instructions may be executed by one or more processors. In addition, the above hardware devices may be configured to act as one or more software modules in order to perform the operations of the above-described exemplary embodiments.

According to exemplary embodiments of character-input method and medium and the device using the same of the present invention, characters can be easily inputted, not restricting a user's sight by improving the user interface.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A character-input method comprising:
providing a plurality of objects having a predetermined arrangement according to a character-input request;
mapping characters included in a character group represented by a representative character mapped to an object identified by a first signal among objects to which at least one representative character is mapped when the first signal is received from a user input device; and
inputting characters mapped to an object identified as a second signal among objects to which representative characters are mapped or objects to which characters included in the character group are mapped when the second signal is received from the user input device,
wherein the representative character represents a predetermined character group, and is mapped to one or more objects among the plurality of objects, and
wherein representative character and the predetermined character group are displayed on a user interface provided by a user-interface-providing device in response to the first signal and other predetermined character groups of other displayed representative characters are not displayed on the user interface provided by the user-interface-providing device.

2. The method of claim 1, wherein the arrangement of the plurality of objects corresponds to the arrangement of the plurality of buttons included in the user input device.

3. The method of claim 2, wherein the user input device senses a touch and a push by a user on the plurality of buttons, and if any among the touch and the push is sensed, the first signal is outputted, and if the other is sensed, the second signal is outputted.

4. The method of claim 3, wherein an object identified by the first signal is arranged at the position corresponding to the button at which the touch is sensed, and an object identified as the second signal is arranged at the position corresponding to the button at which the push is sensed.

5. The method of claim 3, wherein an object identified by the first signal is arranged at the position corresponding to the button at which the push is sensed, and an object identified as the second signal is arranged at the position corresponding to the button at which the touch is sensed among the plurality of buttons.

6. The method of claim 1, wherein the characters include at least one among consonants of Hangeul, vowels of Hangeul, English letters, numbers and symbols.

7. The method of claim 1, wherein the arrangement of the plurality of objects involves 5 objects arranged in a cross form, 8 objects arranged at regular intervals on the circumference containing the 5 objects arranged in the cross form.

8. The method of claim 7, wherein 4 objects are positioned on the extended line of the cross form among 8 objects arranged at regular intervals on the circumference.

9. A user-interface-providing device comprising:
an object-providing module that provides a plurality of objects having a predetermined arrangement;
a character-mapping module that maps characters, which are included in the character group represented by representative characters mapped to objects identified as a first signal among objects to which representative characters are mapped, to one or more objects among the plurality of objects when the first signal is received from a user input device using at least one processor;

a character-input module that inputs characters mapped to objects identified as a second signal among objects to which the characters are mapped when the second signal is received; and an output module that outputs a user-interface including the plurality of objects provided by the object-providing module, the representative characters and the characters mapped by the character-mapping module, and characters inputted by the character-inputting module, wherein the representative character is mapped to one or more objects among the plurality of objects having a predetermined arrangement, and wherein representative character and character group mapped to the representative character are displayed on the user interface in response to the first signal and other character groups mapped to other displayed representative characters are not displayed on the user interface.

10. The device of claim 9, wherein the arrangement of the plurality of objects is of the structure corresponding to the arrangement of the plurality of buttons included in the user-interface-inputting device.

11. The device of claim 10, wherein the user input device senses a touch and a push by a user on the plurality of buttons, and if any among the touch and the push is sensed, the first signal is outputted and if the remaining other is sensed, the second signal is outputted.

12. The device of claim 11, wherein an object identified as the first signal is arranged at the position corresponding to the button at which the touch is sensed, and an object identified by the second signal is arranged at the position corresponding to the button at which the push is sensed among the plurality of buttons.

13. The device of claim 11, wherein an object identified by the first signal is arranged at the position corresponding to the button at which the push is sensed, and an object identified as the second signal is arranged at the position corresponding to the button at which the touch is sensed among the plurality of buttons.

14. The device of claim 9, wherein the characters include at least one among consonants of Hangeul, vowels of Hangeul, English letters, numbers and symbols.

15. The device of claim 9, wherein the arrangement of the plurality of objects involves 5 objects arranged in a cross form, and 8 objects arranged at regular intervals on a circumference containing the 5 objects arranged in the cross form.

16. The device of claim 15, wherein 4 objects are positioned on the extended line of the cross form among 8 objects arranged at regular intervals on a circumference.

17. At least one non-transitory computer readable medium comprising computer readable instructions that control at least one processor to implement the method of claim 1.

18. A character-input method comprising:

mapping a representative character of a character group having a plurality of characters to an object identified by a first signal and mapping other characters of the character group to one or more objects, which have not been mapped to any representative characters; and inputting characters mapped to object identified by a second signal among objects to which representative characters are mapped or objects to which characters included in the character group are mapped, wherein representative character of the character group and the character group are displayed on a user interface provided by a user-interface-providing device in response to the first signal and other character groups mapped to other displayed representative characters are not displayed on the user interface provided by the user-interface-providing device.

19. At least one non-transitory computer readable medium comprising computer readable instructions that control at least one processor to implement the method of claim 18.

20. A user-interface-providing device comprising:

a character-mapping module that maps a representative character of a character group having a plurality of characters to an object identified by a first signal and maps other characters of the character group to one or more objects, which have not been mapped to any representative characters, using at least one processor; and a character-input module that inputs characters mapped to objects identified by a second signal among objects to which representative characters are mapped or objects to which the characters in the character group are mapped; and an output module that outputs a user-interface including objects to which representative characters are mapped and to which the characters in the character group are mapped, wherein representative character of the character group and the character group are displayed on the user interface in response to the first signal and other character groups mapped to other displayed representative characters are not displayed on the user interface.

\* \* \* \* \*